United States Patent
Alexander, Jr.

(10) Patent No.: US 8,031,709 B2
(45) Date of Patent: *Oct. 4, 2011

(54) USER-SPECIFIED KEY CREATION FROM ATTRIBUTES INDEPENDENT OF ENCAPSULATION TYPE

(75) Inventor: Cedell A. Alexander, Jr., Durham, NC (US)

(73) Assignee: Applied Micro Circuits Corporation, San Diego, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 12/371,528

(22) Filed: Feb. 13, 2009

(65) Prior Publication Data

US 2009/0207857 A1  Aug. 20, 2009

Related U.S. Application Data

(63) Continuation of application No. 10/893,117, filed on Jul. 16, 2004, now Pat. No. 7,492,763.

(51) Int. Cl.
 *H04L 12/56* (2006.01)
(52) U.S. Cl. ......... 370/389; 370/392; 370/393; 709/228
(58) Field of Classification Search .................. 370/389, 370/392, 393; 707/6; 709/228
See application file for complete search history.

(56) References Cited

U.S. PATENT DOCUMENTS

| | | | |
|---|---|---|---|
| 5,938,736 A | 8/1999 | Muller et al. | |
| 6,041,053 A | 3/2000 | Douceur et al. | |
| 6,157,955 A | 12/2000 | Narad et al. | |
| 6,356,951 B1 | 3/2002 | Gentry, Jr. | |
| 6,587,463 B1 | 7/2003 | Hebb et al. | |
| 6,598,034 B1 | 7/2003 | Kloth | |
| 6,671,869 B2 | 12/2003 | Davidson et al. | |
| 6,718,326 B2 | 4/2004 | Uga et al. | |
| 6,744,783 B1 | 6/2004 | Tzeng | |
| 7,234,019 B1 | 6/2007 | Kao et al. | |
| 7,293,113 B1 * | 11/2007 | Krishna et al. | 709/250 |
| 7,362,763 B2 | 4/2008 | Wybenga et al. | |
| 7,492,763 B1 * | 2/2009 | Alexander, Jr. | 370/389 |
| 2002/0126672 A1 * | 9/2002 | Chow et al. | 370/392 |
| 2002/0163934 A1 | 11/2002 | Moore et al. | |
| 2003/0037154 A1 | 2/2003 | Poggio et al. | |
| 2003/0081615 A1 | 5/2003 | Kohn et al. | |

(Continued)

OTHER PUBLICATIONS

Entire Prosecution History of U.S. Appl. No. 10/893,117 filed on Jul. 16, 2004 by Cedell A. Alexander Jr. issued as US Patent 7,492,763.

(Continued)

*Primary Examiner* — Luat Phung
(74) *Attorney, Agent, or Firm* — Silicon Valley Patent Group LLP; Omkar Suryadevara

(57) ABSTRACT

An integrated circuit has a hardware decoder that parses a frame to identify a type of encapsulation. The integrated circuit also has a number of hardware parsers, each parser being coupled to the decoder by an enable line. During packet processing, one of the parsers is enabled by the decoder, based on the value which identifies the encapsulation type. The enabled parser retrieves one or more attributes from the frame, depending on the encapsulation. The integrated circuit also has a register, coupled to each parser. The register holds the attributes retrieved by the parser. The integrated circuit also has a key generation hardware which creates a key, by concatenating from the attributes register, certain attributes that are pre-selected by a user for forming the key. The integrated circuit supplies the key to a memory to look up a set of user-specified actions to be performed on data in the frame.

44 Claims, 19 Drawing Sheets

U.S. PATENT DOCUMENTS

| | | | |
|---|---|---|---|
| 2003/0103499 A1* | 6/2003 | Davis et al. | 370/389 |
| 2003/0210702 A1 | 11/2003 | Kendall | |
| 2004/0037276 A1* | 2/2004 | Henderson et al. | 370/371 |
| 2004/0156371 A1 | 8/2004 | Kumar et al. | |
| 2005/0102686 A1 | 5/2005 | Hariharan et al. | |
| 2005/0226242 A1 | 10/2005 | Parker | |
| 2008/0037546 A1 | 2/2008 | Ishikawa et al. | |

OTHER PUBLICATIONS

Heinanen J. et al. "A Two Rate Three Color Marker", University of Pennsylvania, Sep. 1999, pp. 1-5.

Heinanen J. et al. "A Single Rate Three Color Maker", University of Pennsylvania, Sep. 1999, pp. 1-6.

* cited by examiner

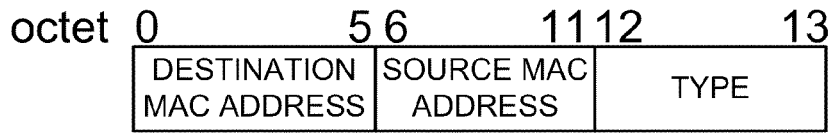
FIG. 1A (prior art)
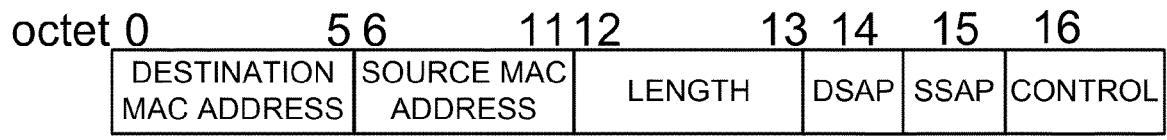
FIG. 1B (prior art)
FIG. 1C (prior art)
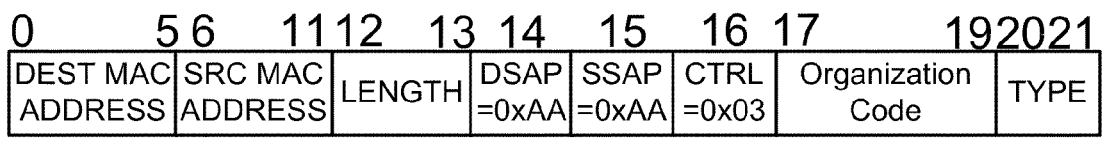
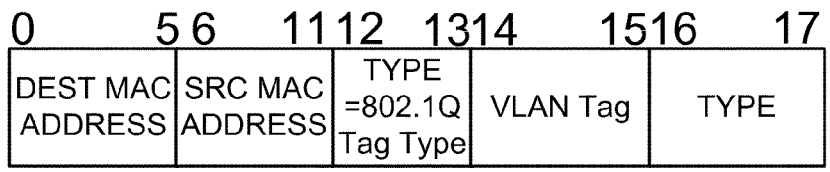
FIG. 1D (prior art)

| 0 | 5 6 | 11 12 | 13 14 | 15 16 | 17 18 | 19 20 | 21 |
|---|---|---|---|---|---|---|---|
| DEST MAC ADDRESS | SRC MAC ADDRESS | TYPE =802.1Q Tag Type | VLAN Tag | TYPE =802.1Q Tag Type | VLAN Tag | TYPE | |

FIG. 1E (prior art)

| 0 | 5 6 | 11 12 | 13 | 14 | 15 | 16 | 17 19 20 | 21 22 | 23 24 25 |
|---|---|---|---|---|---|---|---|---|---|
| DEST MAC ADDRESS | SRC MAC ADDRESS | Length | DSAP =0xAA | SSAP =0xAA | CTRL =0x03 | Org Code | TYPE =802.1Q Tag Type | VLAN Tag | TYPE |

FIG. 1F (prior art)

| 0 | 5 6 | 11 12 | 13 14 | 15 | 16 | 17 19 | 20 | 21 22 23 24 | 25 | 26 27 28 29 |
|---|---|---|---|---|---|---|---|---|---|---|
| DEST MAC ADDR | SRC MAC ADDR | Length | DSAP =0xAA | SSAP =0xAA | CTRL =0x03 | Org Code | TYPE =802.1Q Tag Type | VLAN Tag | TYPE =802.1Q Tag Type | VLAN Tag TYPE |

FIG. 1G (prior art)

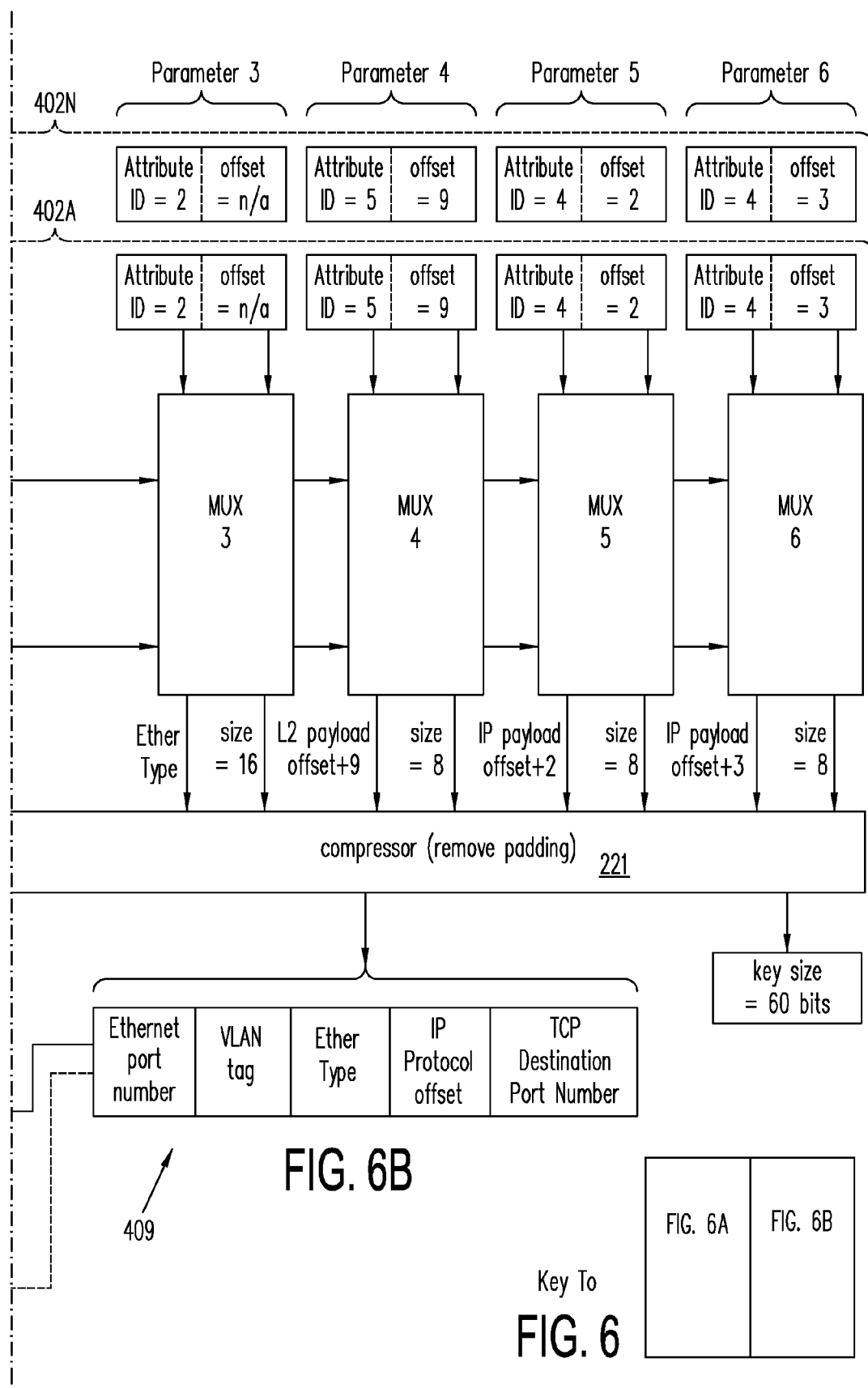

| Parameter | ID | Description | Bits |
|---|---|---|---|
| Port Number | 0 | Port number of Ethernet line interface. | 4 |
| Domain Number | 1 | Domain number configured for Ethernet port. | 4 |
| Ether Type or DSAP/SSAP | 2 | EtherType value from frame for Ethernet v2 and SNAP encapsulations. or {DSAP,SSAP} values for IEEE 802.3 LLC encapsulation. | 16 |
| VLAN Tag | 3 | VLAN Tag value associated with frame. | 16 |
| Nested VLAN Tag | 4 | Nested VLAN Tag value from frame. | 16 |
| VLAN ID/Nested VLAN ID | 5 | {VLAN ID, Nested VLAN ID} values from frame. | 24 |
| VLAN STP State | 6 | Spanning Tree Protocol State for VLAN:<br>• 00 – Blocking<br>• 01 – Listening<br>• 10 – Learning<br>• 11 – Forwarding state | 2 |
| MAC Offset | 7 | Field at configured offset from start of MAC header. | 8 |
| L2 Payload Offset | 8 | Field at configured offset from start of Layer-2 payload. | 8 |
| IP Payload Offset | 9 | Field at configured offset from start of IP payload. | 8 |
| User Data Attribute Offset | 10 | Field at configured offset within User Data Attribute associated with frame. | 8 |
| NOP_2 | 11 | Unused Field of key. | 2 |
| NOP_4 | 12 | Unused Field of key. | 4 |
| NOP_8 | 13 | Unused Field of key. | 8 |

| Field Name | Description | Bits |
|---|---|---|
| Encapsulation Attribute | • 00 – Ethernet v2.<br>• 01 – 802.3 SNAP.<br>• 10 – 802.3 non-SNAP. | 2 |
| VLAN Tag Count Attribute | • 00 – Frame does not contain VLAN Tag.<br>• 01 – Frame contains one VLAN Tag.<br>• 10 – Frame contains multiple VLAN Tags. | 2 |
| Port Number or Domain Number | Port number of Ethernet line interface, or Domain number configured for interface. | 4 |
| User-Defined | One or more of the user-defined key-definition parameters shown in FIG. 9. | 24,56,120, or 184 |
| Total | | 32,64,128, or 192 |

FIG. 11

| Parameter | Description | Bits |
|---|---|---|
| Database Type | Specifies whether the lookup should be performed using a database resident in the internal TCAM or an external TCAM. | 1 |
| EFI ID | Identifies which EFI is to be used to access the database. Only applicable when database is implemented in an external TCAM. | 1 |
| Database ID | Identifies database that lookup accesses. | 4 |
| Key Header Selector | • 0 – Include port number in key header.<br>• 1 – Include domain number in key header. | 1 |
| Key Definition Parameter Count | Number of valid entries in Key Definition Parameter List in range [0,26]. | 5 |
| Key Definition Parameter List | Sequence of key-definition parameters shown in FIG. 9. | 275 |
| Total | | 287 |

FIG. 12

| Field Name | Description | Bits |
|---|---|---|
| Parameter ID | Identifies the key definition parameter that is being configured. A list of the defined Parameter ID values is provided in FIG. 9. | 4 |
| Parameter Argument | Optional argument for parameter that is being configured. Only applicable to the MAC Offset, L2 Offset, IP Payload Offset, and User Data Attribute Offset parameters. The argument field contains the byte-offset associated with the applicable parameters. | 7 |
| Total | | 11 |

FIG. 13

| Parameters | Description | Bits |
|---|---|---|
| MFC Enabled for IPv4 Frames | • 0 – Do not perform MFC for IPv4 frames.<br>• 1 – Perform MFC for IPv4 frames. | 1 |
| MFC Enabled for IPv6 Frames | • 0 – Do not perform MFC for IPv6 frames.<br>• 1 – Perform MFC for IPv6 frames. | 1 |
| MFC Enabled for MPLS Frames | • 0 – Do not perform MFC for MPLS frames.<br>• 1 – Perform MFC for MPLS frames. | 1 |
| MFC Enabled for non-IP/MPLS Frames | • 0 – No MFC for non-IP/MPLS frames.<br>• 1 – Perform MFC for non-IPL/MPLS frames. | 1 |
| MFC ID for IPv4 Frames | ID of MFC lookup parameters for IPv4 frames. | 6 |
| MFC ID for IPv6 Frames | ID of MFC lookup parameters for IPv6 frames. | 6 |
| MFC ID for MPLS Frames | ID of MFC lookup parameters for MPLS frames. | 6 |
| MFC lookup Parameters for non-IP/MPLS Frames | ID of MFC lookup parameters for non IPL/MPLS frames. | 6 |
| Total | | 28 |

| Field Name | Description | Bits |
|---|---|---|
| Result Block Size | • 00 – 64 bits.<br>• 01 – 128 bits.<br>• 10 – 192 bits.<br>• 11 – 256 bits. | 2 |
| Set Counter 1 Action | • 00 or 11 – No action.<br>• 01 – Add 1.<br>• 10 – Add frame length in octets. | 2 |
| Set Counter 2 Action | • 00 or 11 – No action.<br>• 01 – Add 1.<br>• 10 – Add frame length in octets. | 2 |
| Set Discard Counter Action | • 0 – No action.<br>• 1 – Set discard counter. | 1 |
| Discard Frame Action | • 0 – No action.<br>• 1 – Discard frame. | 1 |
| Set VLAN Priority Action | • 0 – No action.<br>• 1 – Set VLAN Priority Attribute. | 1 |
| Set VLAN ID Action | • 0 – No action.<br>• 1 – Set VLAN ID Attribute. | 1 |
| Set DSCP Action | • 0 – No action.<br>• 1 – Set DSCP Attribute. | 1 |
| Police Action | • 0 – No action.<br>• 1 – Police frame. | 1 |
| Set Queue Action | • 0 – No action.<br>• 1 – Set queue for frame. | 1 |
| Set Interface Action | • 0 – No action.<br>• 1 – Set Destination Interface. | 1 |
| Set User Data Action | • 0 – No action.<br>• 1 – Set User Data Attribute. | 1 |
| Set Modification Profile Action | • 0 – No action.<br>• 1 – Set modification profile for frame. | 1 |
| Set MFC Action | • 0 – No action.<br>• 1 – Set next MFC for frame. | 1 |
| Reserved | Reserved for future use. | 14 |
| Total | | 32 |

FIG. 14

| Field Name | Description | Bits |
|---|---|---|
| Header | Header as defined in FIG. 14 | 32 |
| Counter 1 Size | • 0 – 32 bits.<br>• 1 – 64 bits. | 1 |
| Counter 2 Size | • 0 – 32 bits.<br>• 1 – 64 bits. | 1 |
| Counter Pointer | Pointer to memory block containing counter(s). | 20 |
| Number of Discard Counters | • 0 – One discard counter.<br>• 1 – Three discard counters. | 1 |
| Discard Counter Size | • 0 – 32 bits.<br>• 1 – 64 bits. | 1 |
| Discard Counter Pointer | Pointer to block containing discard counter(s). | 20 |
| VLAN Priority | Value of VLAN Priority Attribute. | 3 |
| VLAN ID | Value of VLAN ID Attribute. | 12 |
| DSCP | Value of DSCP Attribute. | 6 |
| Policing Algorithm | • 000 – Token bucket.<br>• 010 – srTCM, color-blind mode.<br>• 011 – srTCM, color-aware mode.<br>• 100 – trTCM, color-blind mode.<br>• 101 – trTCM, color-aware mode. | 3 |
| Policing Mapping Tables Selection Mode | • 000 – Use policing mapping tables with ID = 0.<br>• 001 – Use policing mapping tables with ID = 1.<br>• 010 – Use policing mapping tables with ID = 2.<br>• 011 – Use policing mapping tables with ID = 3.<br>• 100 – Use policing mapping tables configured for Ethernet line interface. | 3 |
| Pre-Color Mapping Mode | • 00 – Pre-color mapping disabled.<br>• 01 – Pre-color mapping enabled for IP.<br>• 10 – Pre-color mapping enabled for MPLS.<br>• 11 – Pre-color mapping enabled for IP and MPLS. | 2 |
| Policing Result Mapping Mode | • 00 – Use default policing result mapping tables for all frames.<br>• 01 – IP policing result mapping tables enabled.<br>• 10 – MPLS policing result mapping tables enabled.<br>• 11 – IP and MPLS policing result mapping tables enabled. | 2 |
| Policing Context Pointer | Pointer to policing context record. | 20 |
| Queue Number | Identifies queue to which frame is assigned. | 3 |
| Interface Number | Identifies interface that frame is forwarded out. | 2 |
| User Data Byte 0 Mode | • 00 – No operation.<br>• 01 – User Data Byte 0 Source field contains immediate data.<br>• 10 – User Data Byte 0 Source field contains byte-offset within MFC key. | 2 |

FIG. 15A

| Field Name | Description | Bits |
|---|---|---|
| User Data Byte 1 Mode | • 00 – No operation.<br>• 01 – User Data Byte 1 Source field contains immediate data.<br>• 10 – User Data Byte 1 Source field contains byte-offset within MFC key. | 2 |
| User Data Byte 2 Mode | • 00 – No operation.<br>• 01 – User Data Byte 2 Source field contains immediate data.<br>• 10 – User Data Byte 2 Source field contains byte-offset within MFC key. | 2 |
| User Data Byte 3 Mode | • 00 – No operation.<br>• 01 – User Data Byte 3 Source field contains immediate data.<br>• 10 – User Data Byte 3 Source field contains byte-offset within MFC key. | 2 |
| User Data Byte 4 Mode | • 00 – No operation.<br>• 01 – User Data Byte 4 Source field contains immediate data.<br>• 10 – User Data Byte 4 Source field contains byte-offset within MFC key. | 2 |
| User Data Byte 5 Mode | • 00 – No operation.<br>• 01 – User Data Byte 5 Source field contains immediate data.<br>• 10 – User Data Byte 5 Source field contains byte-offset within MFC key. | 2 |
| User Data Byte 6 Mode | • 00 – No operation.<br>• 01 – User Data Byte 6 Source field contains immediate data.<br>• 10 – User Data Byte 6 Source field contains byte-offset within MFC key. | 2 |
| User Data Byte 0 Source | Either immediate user data, or byte-offset from beginning of MFC key at which user data starts. | 8 |
| User Data Byte 1 Source | Either immediate user data, or byte-offset from beginning of MFC key at which user data starts. | 8 |
| User Data Byte 2 Source | Either immediate user data, or byte-offset from beginning of MFC key at which user data starts. | 8 |
| User Data Byte 3 Source | Either immediate user data, or byte-offset from beginning of MFC key at which user data starts. | 8 |
| User Data Byte 4 Source | Either immediate user data, or byte-offset from beginning of MFC key at which user data starts. | 8 |
| User Data Byte 5 Source | Either immediate user data, or byte-offset from beginning of MFC key at which user data starts. | 8 |
| User Data Byte 6 Source | Either immediate user data, or byte-offset from beginning of MFC key at which user data starts. | 8 |
| Profile Selection Algorithm | Identifies profile selection algorithm. | 2 |
| Modification Profile ID | Parameter to profile selection algorithm. | 7 |
| MFC ID | Identifies lookup parameters for next MFC. | 6 |
| Reserved | Reserved for future use. | 30 |
| Total (maximum) | | 256 |

FIG. 15B

| Attribute Name | Description | Bits |
|---|---|---|
| Frame Length Attribute | Length of frame in octets. | 16 |
| Modification Profile ID Attribute | Identifies modification profile to be executed for frame. | 8 |
| Encapsulation Attribute | • 00 – Ethernet v2.<br>• 01 – 802.3 SNAP.<br>• 10 – 802.3 non-SNAP. | 2 |
| VLAN Tag Count Attribute | • 00 – Frame does not contain VLAN Tag.<br>• 01 – Frame contains one VLAN Tag.<br>• 10 – Frame contains multiple VLAN Tags. | 2 |
| Port Number Attribute | Port number of Ethernet line interface. | 4 |
| Domain Number Attribute | Domain number configured for Ethernet port. | 4 |
| VLAN Tag Attribute | Includes VLAN Priority & VLAN ID Attributes. | 16 |
| VLAN STP State Attribute | • 00 – Blocking.<br>• 01 – Listening.<br>• 10 – Learning.<br>• 11 – Forwarding. | 2 |
| DSCP Attribute or EXP Attribute | DSCP for IP frames or EXP for MPLS frames. | 6 |
| Color Attribute | • 01 – Green.<br>• 10 – Yellow.<br>• 11 – Red. | 2 |
| User Data Attribute | User-defined data. | 56 |

FIG. 16

| Field Name | Description | Bits |
|---|---|---|
| Encapsulation Attribute Selection | • 0 – Encapsulation Attribute not selected.<br>• 1 – Encapsulation Attribute selected. | 1 |
| VLAN Tag Count Attribute Selection | • 0 – VLAN Tag Count Attribute not selected<br>• 1 – VLAN Tag Count Attribute selected. | 1 |
| Port Number Attribute Selection | • 0 – Port Number Attribute not selected.<br>• 1 – Port Number Attribute selected. | 1 |
| Domain Number Attribute Selection | • 0 – Domain Number Attribute not selected.<br>• 1 – Domain Number Attribute selected. | 1 |
| VLAN Tag Attribute Selection | • 0 – VLAN Tag Attribute not selected.<br>• 1 – VLAN Tag Attribute selected.<br>Note: When VLAN Tag Attribute is selected, the VLAN Priority Attribute Selection and the VLAN ID Attribute Selection fields are not applicable. | 1 |
| VLAN Priority Attribute Selection | • 0 – VLAN Priority Attribute not selected.<br>• 1 – VLAN Priority Attribute selected.<br>Note: When selected, the VLAN Priority is stored in the most-significant three bits of a 4-bit field. | 1 |
| VLAN ID Attribute Selection | • 0 – VLAN ID Attribute not selected.<br>• 1 – VLAN ID Attribute selected.<br>Note: When selected, the VLAN ID Attribute is stored in a 12-bit field. | 1 |
| VLAN STP State Attribute Selection | • 0 – VLAN STP state Attribute not selected.<br>• 1 – VLAN STP state Attribute selected. | 1 |
| DSCP/EXP Attribute Selection | • 0 – DSCP/EXP Attribute not selected.<br>• 1 – DSCP/EXP Attribute selected. | 1 |
| Color Attribute Selection | • 0 – Color Attribute not selected.<br>• 1 – Color Attribute selected. | 1 |
| Total | | 10 |

USER-SPECIFIED KEY CREATION FROM ATTRIBUTES INDEPENDENT OF ENCAPSULATION TYPE

CROSS-REFERENCE TO PARENT APPLICATION

This application is a continuation application of U.S. application Ser. No. 10/893,117, now U.S. Pat. No. 7,492,763 filed on Jul. 16, 2004 by Cedell A. Alexander, Jr. entitled "USER-SPECIFIED KEY CREATION FROM ATTRIBUTES INDEPENDENT OF ENCAPSULATION TYPE." U.S. application Ser. No. 10/893,117 is incorporated by reference herein in its entirety, including all Appendices.

CROSS-REFERENCE TO COMPUTER PROGRAM LISTING APPENDIX

Appendix A contains the following file, submitted herewith electronically, in IBM-PC format and compatible with Microsoft Windows. Appendix A is a part of the present disclosure and is incorporated by reference herein in its entirety.

| Jul. 16, 2004 03:05p | 29,223 parser.txt |
|---|---|
| 1 File(s) | 29,223 bytes |
| 0 Dir(s) | 0 bytes free |

The file "parser.txt" in Appendix A forms source code of a computer program (in the form of C language) for documenting the implementation of certain circuitry used in an illustrative embodiment of the present invention, containing an encapsulation-dependent hardware block, as illustrated in FIG. 3 and described below. The code in Appendix A is in the C language and provides a behavioral description of the hardware used in one specific illustrative embodiment.

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyright rights whatsoever.

BACKGROUND

1. Field of the Invention

The invention relates to processing of packets. More specifically, the invention relates to a method and an apparatus for determining from a frame, one or more attributes (e.g. VLAN tag) that are at different locations in the frame depending on the type of encapsulation, and use of one or more such attributes to create a key as specified by a user and use of the key to identify instructions to be executed also specified by the user.

2. Related Art

U.S. Pat. No. 6,587,463 that is incorporated by reference herein in its entirety describes packet classification by use of a rule memory and a criterion memory. Control logic responds to packet classification requests by retrieving from rule memory an operator and a pointer to an entry in criterion memory. The operator defines a comparison operation to be performed between comparands from criterion memory and corresponding values from a received packet. The results are provided to a packet processor to take an appropriate action.

U.S. Pat. No. 6,598,034 that is also incorporated by reference herein in its entirety describes a set of rules that are developed and stored for use by a Just-In-Time (JIT) compiler, a run-time compiler or the like. The rules establish a set of patterns, and the incoming data is compared to those patterns. If certain patterns are detected, then the associated action established by the rule is applied to the processing of the data packet.

U.S. Pat. No. 6,718,326 which is incorporated by reference herein in its entirety describes use of a CAM which has a limited bit width to search rules of packet classification having very long search bit width. The fields of rules of packet classification are grouped into groups, and the grouped fields of each rule are stored along with search related information (except for the initial group) and number of search information in a CAM.

Certain prior art network processors may be programmed, in software, to process packets that are encapsulated in frames whose headers have formats of the type shown in FIGS. 1A-1G, which are as follows:
 FIG. 1A—Ethernet v2 untagged
 FIG. 1B—802.3 untagged
 FIG. 1C—SNAP untagged
 FIG. 1D—Ethernet v2 with 1 VLAN tag
 FIG. 1E—Ethernet v2 with 2 VLAN tags
 FIG. 1F—SNAP with 1 VLAN tag
 FIG. 1G—SNAP with 2 VLAN tags To handle packets that are encapsulated in frames of multiple formats, it is common for a prior art network processor to be programmed, by the user, to contain a rule for each of the above-listed seven encapsulations (FIGS. 1A-1G). Specifically, the user is required to have knowledge of the format of the above-listed seven encapsulations and to repeatedly perform the programming, once for each encapsulation.

SUMMARY

An integrated circuit has at least one input port to be coupled to a network, to receive a frame from the network. The integrated circuit also has a hardware decoder that is coupled to the input port to retrieve at least one value that is located at a predetermined location in the frame. The value at the predetermined location identifies a type of encapsulation, such as Ethernet v2 or 802.3 with or without one or more VLAN tags. The integrated circuit also has a number of hardware parsers, each parser being coupled to the decoder by an enable line, each parser being further coupled to the input port.

During processing of a received frame, one of the parsers is enabled by the decoder, based on the above-described value which identifies the encapsulation type. The enabled parser retrieves one or more attributes of the frame, based on a format for the encapsulation that is hardwired into the parser. The integrated circuit also has a register, coupled to each parser. The register holds attributes of the frame that have been retrieved by the parser from different locations in the frame, depending on the encapsulation.

The integrated circuit also has a key generator which creates a key by concatenating values of certain attributes from the received frame that are pre-selected by a user for forming the key. The integrated circuit supplies the key to a memory (which may be either in the integrated circuit i.e. on-chip or outside the integrated circuit i.e. off-chip) to look up a set of user-specified actions to be performed on data in the frame. The actions may be specified by the user in the form of instructions to a processor also included in the integrated circuit. The instructions may include an instruction to enable one or more additional search operations to be performed on attribute values of the received frame.

BRIEF DESCRIPTION OF THE FIGURES

FIGS. 1A-1G illustrate prior art formats of headers in frames of different encapsulations.

FIGS. 9, 10, 11, 12, 13, 14, 15A, 15B, 16 and 17 illustrate, in tables, various parameters, attributes, fields and their related descriptions as discussed in Attachment C.

DETAILED DESCRIPTION

Figure 2A:
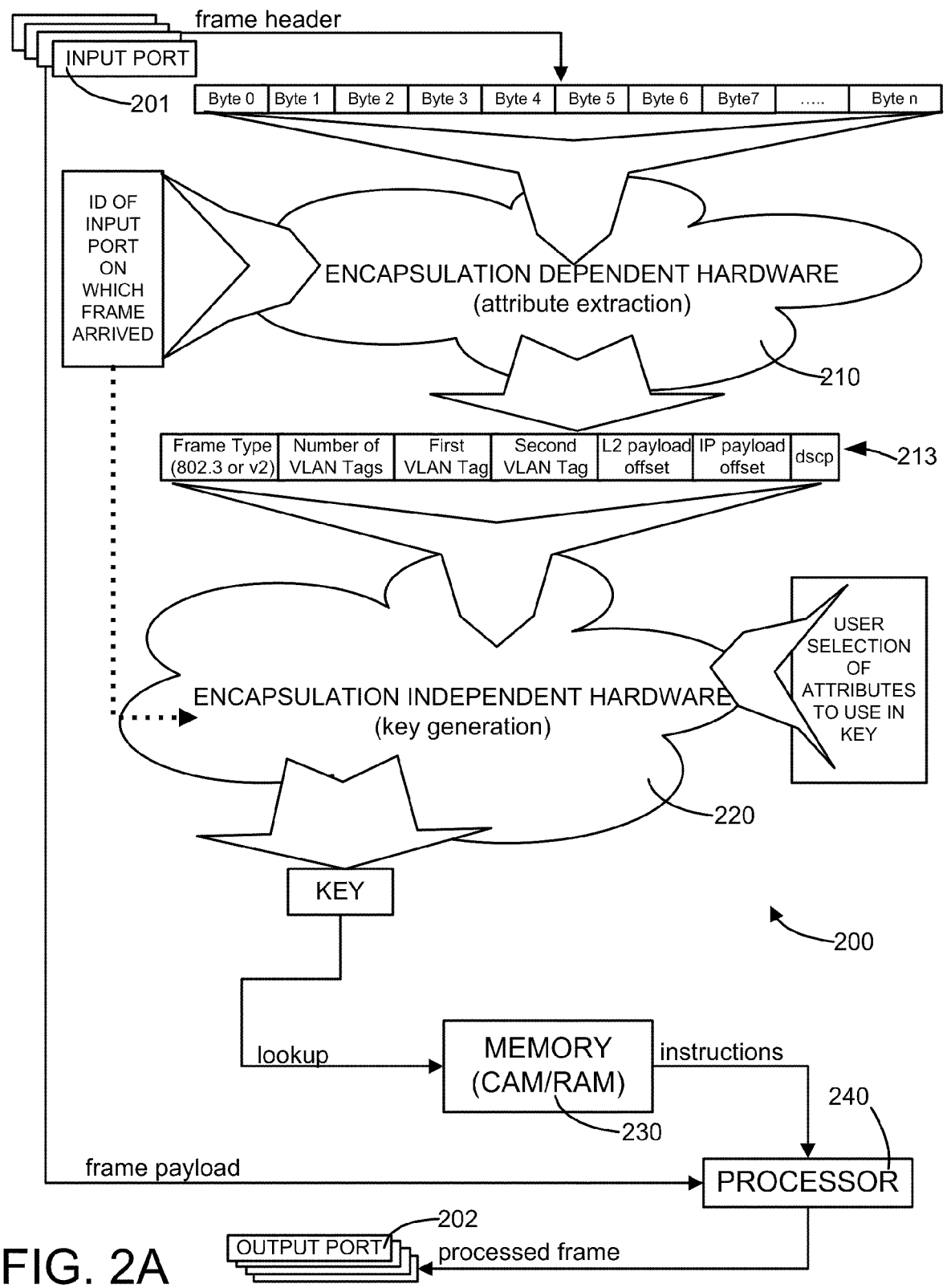
FIG. 2A illustrates, in a high-level block diagram in accordance with the invention, an encapsulation dependent hardware block and an encapsulation independent hardware block, with user specifications for generation of a key being supplied to the encapsulation independent hardware block.

A circuit 200 (FIG. 2A) in accordance with the invention has two hardware blocks 210 and 220 that are respectively dependent on and independent of a type of encapsulation used to embed data in frames that are received at one or more input ports 201 of circuit 200. Circuit 200 of many embodiments is implemented as a single integrated circuit as discussed below, although in other embodiments it can be implemented in a combination of two or more integrated circuits. Encapsulation-dependent hardware block 210 of some embodiments extracts attributes that are located at different positions in a frame, depending on the frame's encapsulation type. Encapsulation-independent hardware block 220 of these embodiments selectively uses certain of the attributes, in a manner specified by the user, to generate a key.

Integrated circuit 200 supplies the key to a memory 230 (which may be either in the integrated circuit i.e. on-chip or outside the integrated circuit i.e. off-chip), to look up a set of user-specified actions to be performed on data in the frame. Note that in several embodiments, the key is used directly or with additional information concatenated thereto, to perform a memory look up, without any logic processing on the key. For example, no logical "AND", "NOT" and "OR" operations are performed on the key in such embodiments. Moreover, actions that are identified by the memory look up, for performance on the frame, may be specified by the user in the form of instructions to a processor 240 (which may also be either on-chip or off-chip). A processed frame generated by processor 240 after execution of the instructions may be transmitted on one or more of output ports 202, into a network to which ports 201 and 202 are coupled.

Note that in the above-described embodiments, the user specifies how a key is to be generated based on attributes that have already been extracted by encapsulation-dependent hardware block 210. For this reason, in many embodiments in accordance with the invention, each attribute to be used to form the key is specified by the user symbolically, without reference to a corresponding location in the frame at which the attribute is located for each type of encapsulation. For example, a VLAN tag field is symbolically specified by the user (e.g. as being "attribute 3"), for inclusion in a key, without specifying each of four different locations at which this field occurs in certain encapsulations that are supported in some embodiments of the invention. Locations that are not specified by the user, when using a VLAN tag field symbolically, are shown in Table A as octets that are at different locations for each encapsulation

TABLE A

| FIGURE | ENCAPSULATION TYPE | Octets |
| --- | --- | --- |
| FIG. 1D | Ethernet v2 with 1 VLAN tag | 14, 15 |
| FIG. 1E | Ethernet v2 with 2 VLAN tags | 18, 19 |
| FIG. 1F | SNAP with 1 VLAN tag | 22, 23 |
| FIG. 1G | SNAP with 2 VLAN tags | 26, 27 |

Hence, the user need not specify physical locations of a field (e.g. as shown in the above table) to be used in key generation. Instead, such locations are hard-coded into encapsulation-dependent hardware block 210 in accordance with the invention. As noted above, block 210 automatically extracts the VLAN tag field (in this example) and makes it available for use (along with several other such attributes) independent of physical locations of attributes in the frame.

Several advantages accrue to an architecture of the type shown in FIG. 2A wherein attributes are made available independent of physical locations in the frame. First, the user need not know the physical locations of various attributes in different types of encapsulations. Second, the user needs to specify just a single attribute value, for all encapsulation types. Therefore, in some embodiments of the invention, the number of rules used in the prior art is reduced (proportional to the number of encapsulations that are supported), thereby to improve efficiency (save storage). Furthermore, a user interface is simplified in such embodiments because the attributes are specified symbolically and only one value is specified for multiple encapsulation types.

Some embodiments of the invention perform a method 290 (FIG. 2B) as follows. Specifically, in act 291, integrated circuit 200 receives from the user a symbolic indication of one or more attributes of a frame to use in key creation. Note that in act 291, integrated circuit 200 does not receive an indication of a location in the frame for each encapsulation (i.e. a fourth register in an attribute register file, also called "attribute 3" may be used to hold the value of a VLAN tag). Integrated circuit 200 also receives, in act 292, a set of instructions to be executed when attributes of a frame have values that match certain values that are also specified to integrated circuit 200 by the user. Note that such values (to be checked against a frame's values) are specified in act 292. Integrated circuit 200 stores the values received in acts 291 and 292, either in on-chip memory or in off-chip memory (depending on the embodiment). After performance of acts 291 and 292, integrated circuit 200 is now ready for use in processing frames (and packets embedded within the frames), as discussed next.

Figure 2B:
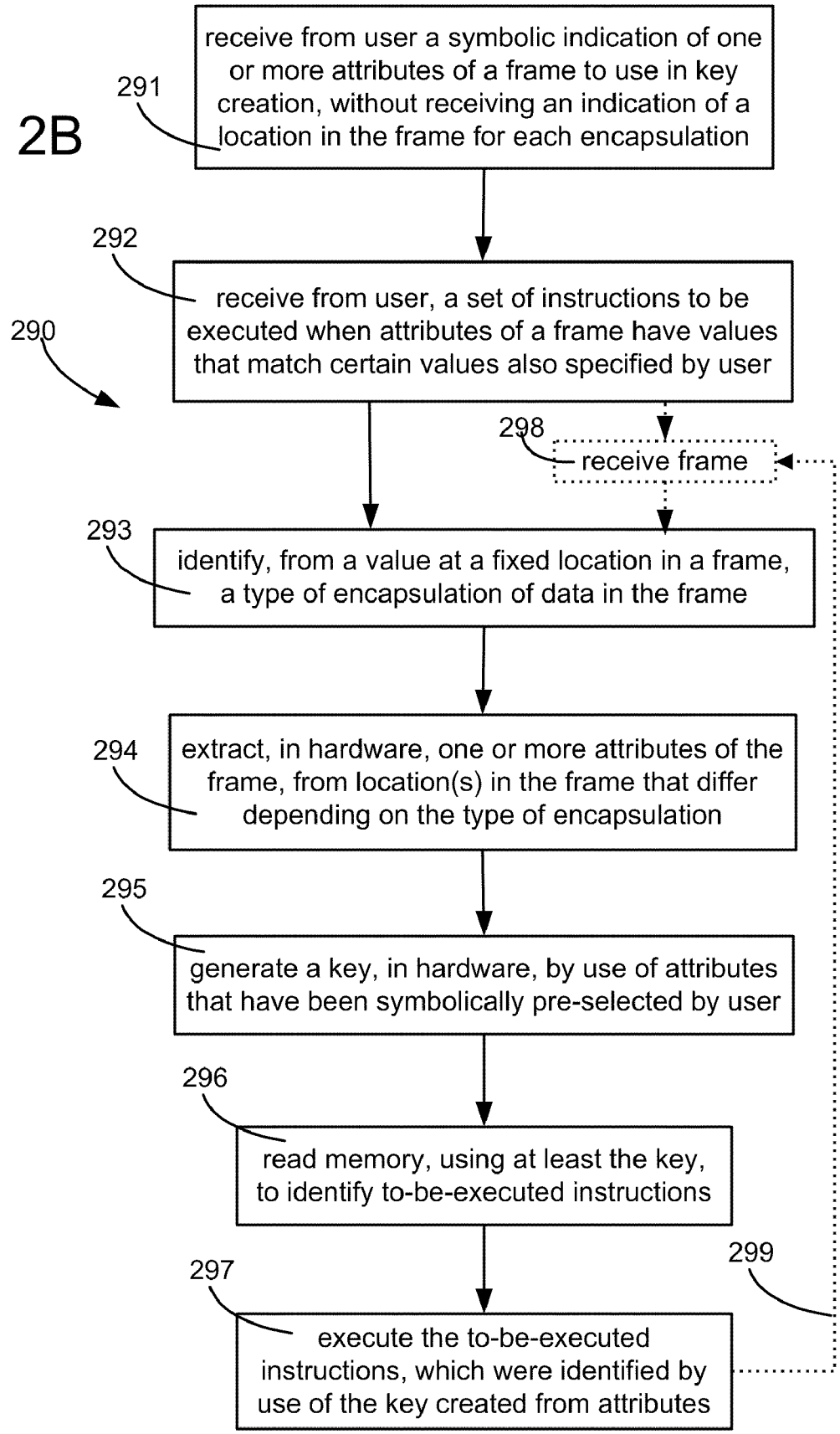
FIG. 2B illustrates, in a high-level flow chart in accordance with the invention, acts performed in some embodiments of circuitry shown in FIG. 2A.
Figure 3:
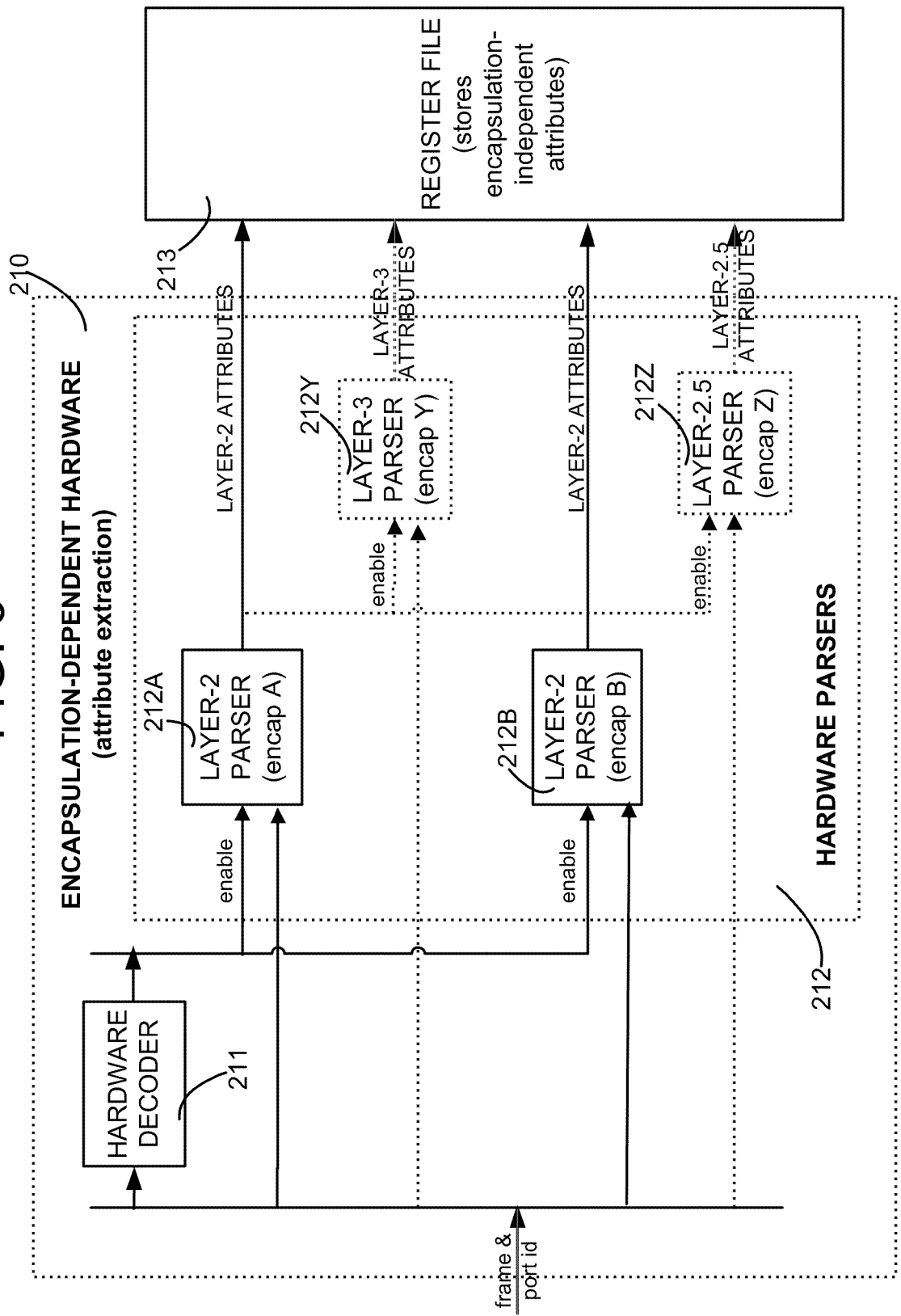
FIG. 3 illustrates, in an intermediate level block diagram, an encapsulation dependent hardware block that includes a decoder and a number of hardware parsers that are coupled to the decoder to receive an enable signal therefrom.

Specifically, when a frame is received (as per act 298 in FIG. 2B), integrated circuit 200 identifies (as per act 293), from a value at a fixed location in the frame, a type of encapsulation of data in the frame. For example, if the value of octets 12 and 13 (which form a "type" field or a "length" field depending on encapsulations) is greater than or equal to 1536 then the encapsulation type is identified as being Ethernet v2 and otherwise the encapsulation type is identified as being IEEE 802.3. Hence, checking of the value of octets 12 and 13 in each frame is performed, in some embodiments, by a hardware decoder 211 that is included in some embodiments of encapsulation-dependent hardware block 210 (FIG. 3). Such a block 210 implements the following function in hardware, wherein Packet_Type=1 if the packet is Ethernet v2, and Packet_Type =0 if 802.3:

if ([octet 12, octet 13]<16'd1536) then
    Packet_Type=0
else
    Packet_Type=1;

Referring to FIG. 2B, the result of act 293 is used in act 294 to enable a parser implemented in hardware to be used for the identified encapsulation type, and the rest of the frame is decoded by the enabled parser. Specifically, in act 294, an appropriate one of hardware parsers 212 shown in FIG. 3 is enabled depending on the type of encapsulation (e.g. parser 212A is enabled if the type of encapsulation is "A" and alternatively parser 212B is enabled if the encapsulation type is "B"), and on being enabled it extracts one or more attributes of the frame, from predetermined location(s) appropriate for that type of encapsulation. Attributes that are extracted from the frame header are also referred to as "layer-2" attributes.

For example, if the encapsulation is Ethernet v2 with one VLAN tag, then assume that hardware parser 212A (also called "Layer-2 parser") is enabled and so parser 212A retrieves a layer-2 attribute called "VLAN tag" from octets 14 and 15 of the frame. As another example, if the encapsulation is SNAP with one VLAN tag, then assume that hardware parser 212B is enabled and so parser 212B retrieves a VLAN tag from octets 22 and 23 of the frame.

Note that although only two Layer-2 parsers 212A and 212B are shown in FIG. 3 for illustrative purposes, any number of Layer-2 parsers may be included in encapsulation-dependent hardware 210 in accordance with the invention. Note that in some embodiments there are as many Layer-2 parsers as the number of encapsulations that are supported. The extracted attributes are supplied, by whichever hardware parser 212 was enabled, to a register 213.

Depending on the embodiment, certain hardware parsers 212 of FIG. 3 may extract attributes from a payload of the frame, such as Layer-2.5 attributes (in which case they are also called "Layer-2.5 parsers") or Layer-3 attributes (in which case they are also called "Layer-3 parsers"). Such attributes are typically embedded within headers that are located in the frame's payload portion and the related parsers need not be implemented in all embodiments.

Figure 4:
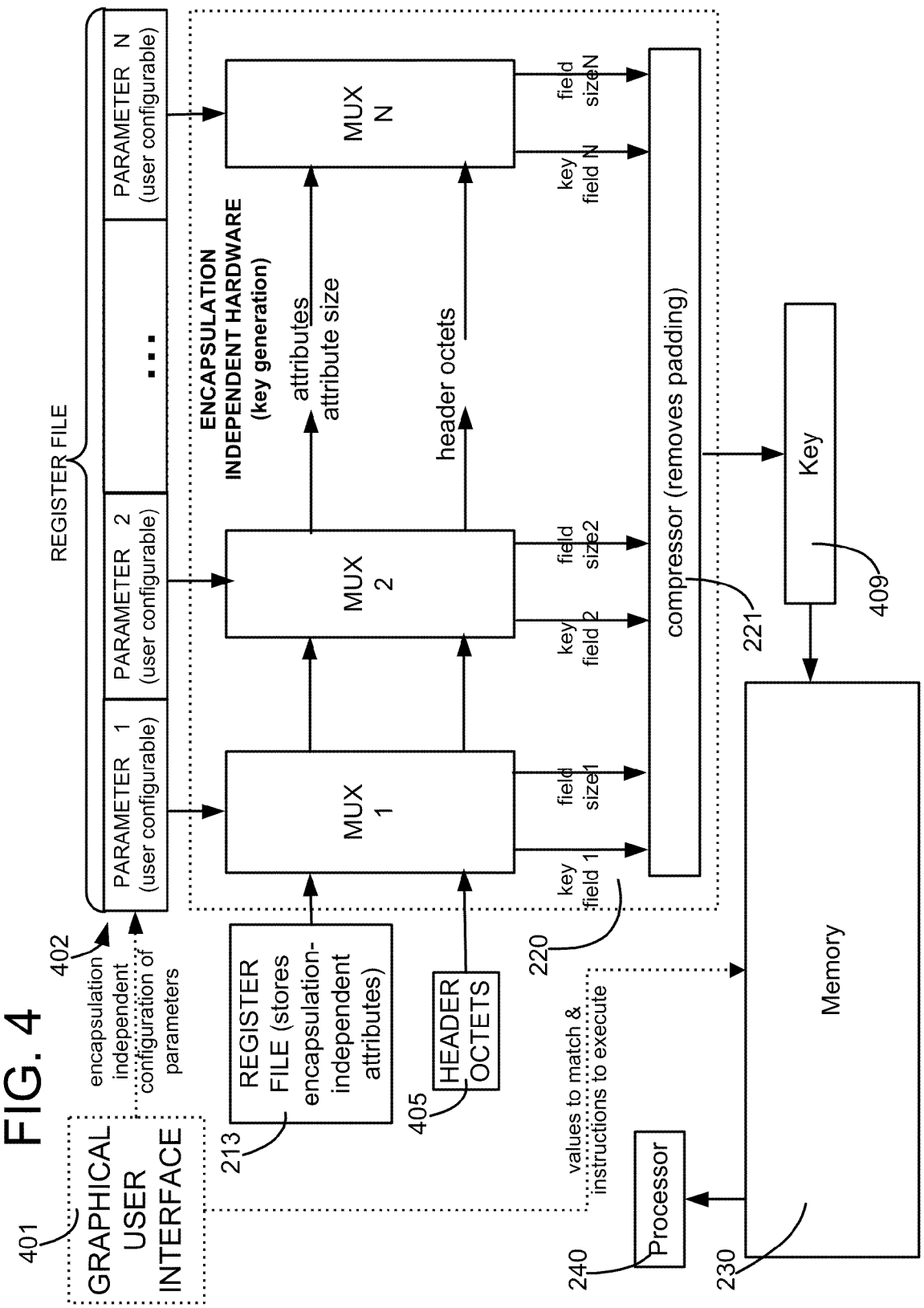
FIG. 4 illustrates, in an intermediate level block diagram, an encapsulation independent hardware block that includes multiplexers and a compressor to generate a key, and memories that are coupled to the compressor to receive the key to be used to look up the memory.

Next, as per act 295 in FIG. 2B, the values in register 213 are used to generate a key, by use of attributes that are symbolically pre-selected by the user. Note that the attributes in register 213 are independent of encapsulation. It is the names of these attributes (such as the name "VLAN tag" which may be represented internally as "attribute 3") that are made available to the user, via a Graphical User Interface (GUI) 401 (FIG. 4) for symbolic selection by setting up values for parameters in a register file 402. During frame processing by the above-described integrated circuit, these parameters (labeled "PARAMETER A" . . . "PARAMETER N" in FIG. 4) are automatically used to select one or more values from register file 213 (i.e. values of user-specified attributes), and optionally one or more values from header octets 405. The selected values from file 213 and octets 405 in turn are concatenated and compressed (as noted in the next paragraph) when generating a key.

Specifically, a set of multiplexers labeled "MUX 1" . . . "MUX N" in FIG. 4 use the user input in register file 402 to select one or more values of attributes in register 213 and/or header octets. The values selected by the multiplexers (labeled in FIG. 4 as "key field 1" . . . "key field N") are supplied to a compressor 221. Compressor 221 removes zero or more padding bits from the values supplied by the multiplexers and concatenates them to form a key (e.g. in "key field 1" only the low order bits that are "field size 1" in number have valid values and the remaining bits are stripped off before concatenation with other such fields).

Next, as per act 296 (FIG. 2B), a newly-created key (shown in FIG. 4 as being held in a register 409) is used to read memory 230, to identify instructions that are to be executed. These instructions are supplied to and executed by processor 240 as per act 297 in FIG. 2B. Above-described acts 293-297 are performed in several embodiments whenever a frame is received, as shown by the dashed line 299. Note that hardware 220 (FIG. 4) consists of only multiplexers and a compressor, and for this reason, this hardware 220 is independent of the type of encapsulation.

Figure 5:
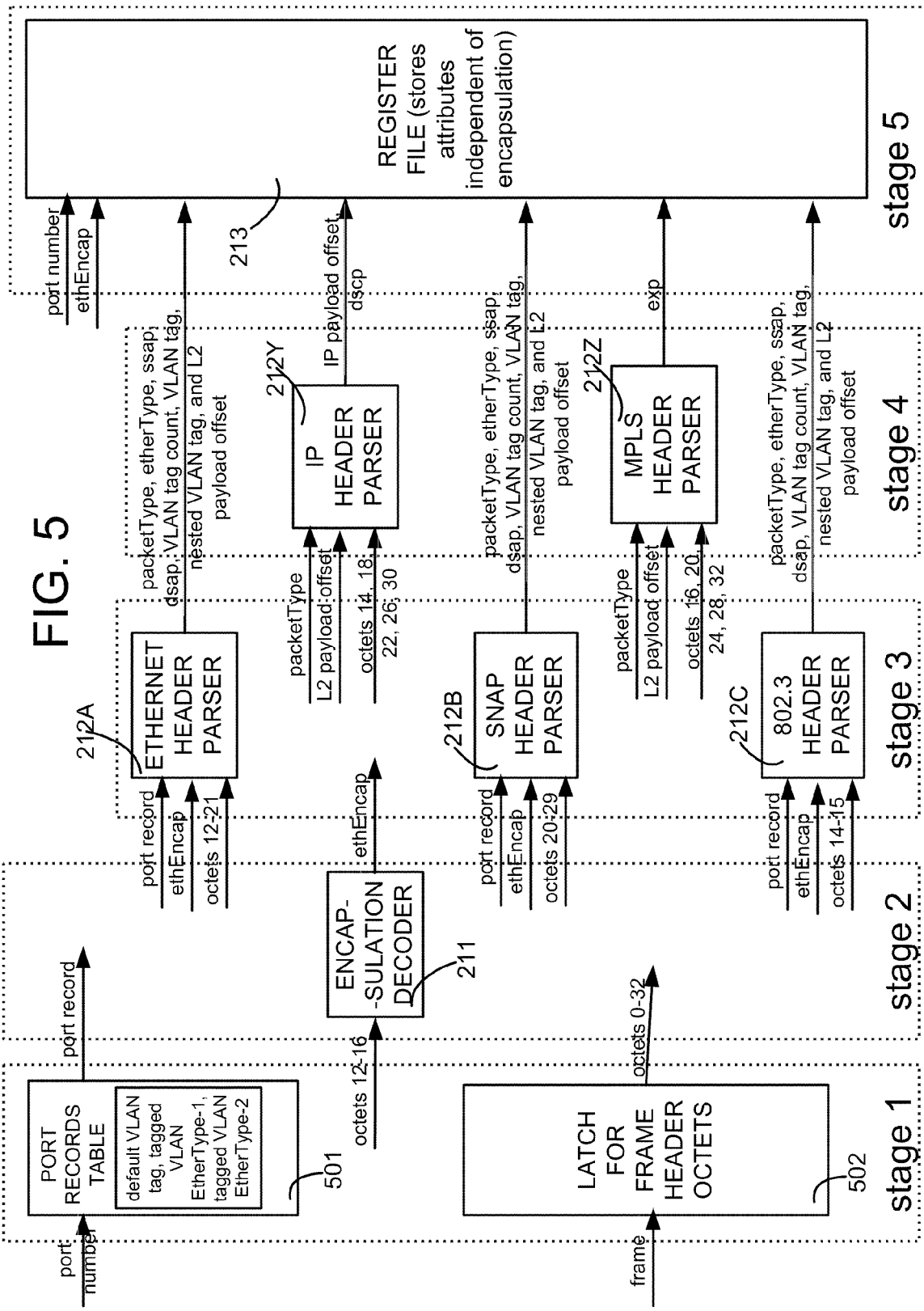
FIG. 5 illustrates an exemplary implementation of the intermediate level block diagram of FIG. 3.

An exemplary implementation of encapsulation-dependent hardware 210 is illustrated in detail in FIG. 5. As shown in FIG. 5, a stage 1 contains two blocks of memory, specifically a table 501 of port records and a latch 502 that holds octets from the header of a frame. The port records table 501 receives as input the identifier of a port on which a frame (to be processed) has arrived. In response to the port identifier (also called Ethernet port number), the port records table 501 provides a record containing values (which may be either user-specified or hardwired) descriptive of the port, such as the default VLAN tag, tagged VLAN EtherType-1, tagged VLAN EtherType-2.

In some embodiments, such values are configurable by the user, as described below. Such port-descriptive information is used in three Layer-2 header parsers, namely an Ethernet header parser 212A, a SNAP header parser 212B and an 802.3 header parser 212C, wherein "SNAP" is an abbreviation of "Subnetwork Access Protocol" which is detailed in IETF RFC 1042. The RFC 1042 is incorporated by reference herein in its entirety.

Some embodiments that support VLAN tags may use, in octets 12 and 13 (see FIG. 1D) of a frame, a value for the type field other than the value x8100 defined in IEEE 802.3 standard to indicate the presence of VLAN tags, e.g. the value x9100 may be used in the first type field (octets 12 and 13 in FIG. 1E) to indicate the presence of multiple nested VLAN tags and the value x8100 may be used in the second type field (octets 18 and 19 in FIG. 1E). For this reason, several such embodiments of an integrated circuit 200 allow the user to set, for each specific port, two values (specified as tagged VLAN EtherType-1 and tagged VLAN EtherType-2) to be used by the integrated circuit 200 in parsing frames that are received on that specific port.

Stage 1 of FIG. 5 supplies certain specific octets from the header, e.g. octets 12-16 in one implementation, to stage 2 which contains a hardware decoder 211 of the type described above. The hardware decoder 211 in stage 2 generates a value called "ethEncap" which is used as an enable signal to one of the three hardware parsers 212A-212C in stage 3 (described above). Only one of the three Layer-2 header parsers is enabled to process any given frame. When enabled, the a Layer-2 header parser uses the port-descriptive information (described above), and certain octets from the frame's Layer-2 header (which are different for each parser) to store in register file 213 the following attributes: packettype, ethertype, ssap, dsap, VLAN tag count, VLAN tag, nested VLAN tag, and L2 payload offset, which attributes are described next.

The attribute packettype represents a signal internal to an integrated circuit of the type described above, and this attribute has three different values: IP, MPLS and Layer-2 (where Layer-2 means anything other than IP and MPLS). The attribute etherType is same as the type field in octets 12 and 13 of the frame formats as illustrated in FIGS. 1A, 1D, 1E and 1G, and has values of the type described above. The attributes "ssap" and "dsap" are source and destination "service access ports" that are fields in a logical link control (LLC) header shown in FIG. 1B. The attributes "ssap" and "dsap" represent the source and destination ports for the LLC connection. For more information on LLC parameters, see IEEE 802.2 standard that is incorporated by reference herein in its entirety.

Moreover, the attribute VLAN tag count is either 0, 1 or 2 which indicates the number of VLAN tags that were found in the frame, and it is a signal internal to an integrated circuit of the type described above. Furthermore, VLAN tag is the outermost VLAN tag if the frame contains a VLAN tag, and if the frame is untagged then a user-specified default VLAN tag associated with the port is used as the VLAN tag. Note that in such embodiments, the attributes register holds a VLAN tag for every frame regardless of whether or not the frame contains the VLAN tag. The attribute nested VLAN tag is the innermost VLAN tag in the frame (if the VLAN tag count is 2). Moreover, the attribute L2 payload offset is the location where the Layer-2 payload begins, after each header shown in FIGS. 1A-1G.

The embodiment illustrated in FIG. 5 also contains two additional header parsers in a stage 4. Specifically, stage 4 header parsers receive as input two attributes generated by stage 2, namely: L2 payload offset and packettype. Note that an output line of the stage 3 that carries the attribute packettype is coupled to an enable line of the parser in stage 4. In addition, each header parser in stage 4 receives certain octets from the frame header as follows: an IP header parser 212Y receives octets 14, 18, 22, 26 and 30 whereas an MPLS header parser 212Z in stage 4 receives octets 16, 20, 24, 28 and 32.

Each of these stage 4 header parsers 212Y and 212Z then stores in register file 213 (FIG. 3) one or more attributes that are extracted from a layer-2 payload (e.g. IP header parser 212Y generates the attributes "IP payload offset" and "dscp," whereas the MPLS header parser generates the attribute "exp"). Note that the attribute "dscp" stands for "differentiated services code point" which is defined in RFC 2474 that is incorporated by reference herein. Moreover, the attribute "exp" stands for a three bit field in the MPLS label called "experimental bits", as defined in RFC 3031.

Figure 6A:
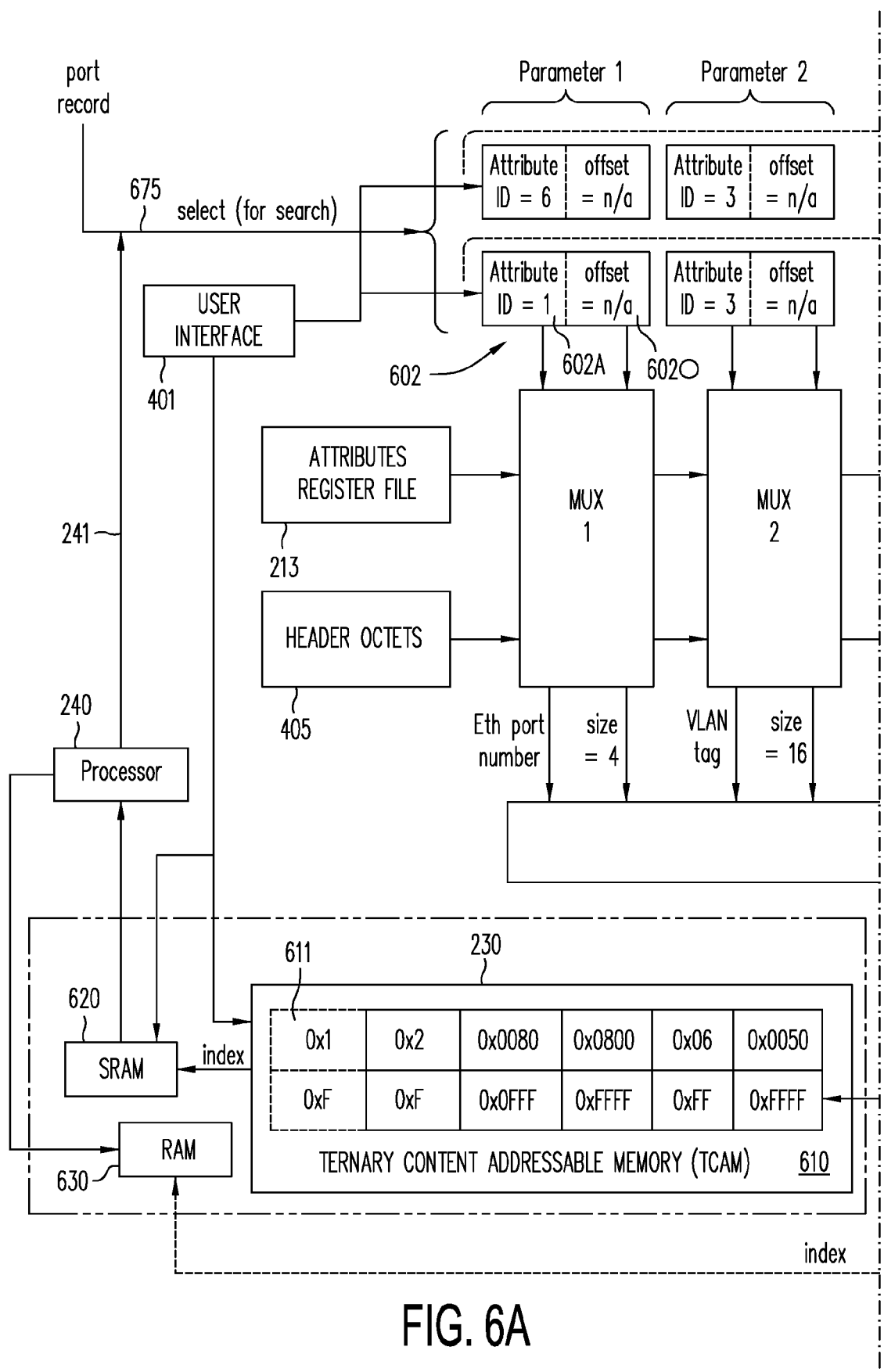
FIG. 6 illustrates an exemplary implementation of the intermediate level block diagram of FIG. 4.

In an exemplary illustration shown in FIG. 6, register file 213 is hardwired in integrated circuit 200, to hold the following attributes. Note that the organization of file 213 can be different in other embodiments. A first element of register file 213 is Attribute 1 which is hardwired to be the Ethernet port number (on which the frame is received). The second element of attributes register file 213 is Attribute 2 which is hardwired to be the Ether Type (which is at different locations in the frame, depending on the encapsulation). The third element of attributes register file 213 is Attribute 3 which is hardwired to be the VLAN tag (which is also at different locations in the frame, depending on the encapsulation). The fourth element of attributes register file 213 is Attribute 4 which is hardwired to cause the selection of an offset in the IP payload (which is at different locations in the frame, depending on the encapsulation). Finally, the fifth element of attributes register file 213 is Attribute 5 which is hardwired to be the L2 payload offset (which is also at different locations in the frame depending on the encapsulation).

As noted above, the hardware for key generation in integrated circuit 200 contains storage elements that are user configurable in the form of a number of register files 402A-402N (wherein N, e.g. 64, is the number of register files; see FIG. 6). Having a set of register files 402A-402N enables the user to configure a corresponding number of keys (otherwise the user would be forced to apply only a single key to all frames). GUI 401 provides a mechanism for the user to load any desired values into each of register files 402A-402N (also called "parameters" register files 402A-402N). Specifically, the user may load values in register file 402A from a device external to the integrated circuit, such as a personal computer that executes graphical user interface 401.

Note that although there are N register files, only one register file 402I is enabled during packet processing for use as discussed above in reference to FIG. 4, e.g. by a select signal on bus 675. Specifically, in some embodiments, a register file may be initially enabled via bus 675 in response to a user-configurable value in a port record of a port on which a frame is received (see output of table 501 in FIG. 5). In such embodiments, another register file may be enabled at a later time for use with attributes of the same frame, e.g. via a select signal on bus 241 that is supplied by processor 240. Processor 240 may supply such a select signal while executing instructions that were identified by use of an initial key that is generated from the initially enabled register file (as identified in the port record). Note that processor 240, when identifying a register file, may do so as a part of the identity of a search operation that also contains, for example, the database identifier and the database type.

A group of storage elements 602 in register file 402A for each parameter (labeled "PARAMETER 1" . . . "PARAMETER 6" in FIG. 6) contain at least two portions in the embodiment illustrated in FIG. 6, namely an attribute ID register 602A and an offset register 602O. The value in register 602A is loaded by the user to symbolically identify the location of an attribute to be used in the key, from the attributes register file 213. Note that although in FIG. 6, only six parameters are shown as being available to prepare a key, any fixed number (e.g. 16) parameters may be available in a given architecture, depending on the embodiment.

The attribute identifier specified in any given PARAMETER I is used by a corresponding MUX I to select a specified attribute value from register file 213 and supply the selected value on an output bus to compressor 221. Each PARAMETER I also contains a storage element to hold an identifier of an offset into the frame header, from which an appropriate octet is supplied by the corresponding MUX I on the output bus to compressor 221. Note that in this embodiment MUX I also obtains from attributes register file 213 the size of the attribute value that is being retrieved from register file 213 (and if present the size of the offset value), and passes the size to compressor 221.

In the exemplary illustration in FIG. 6, the user has configured the parameters register file 402 as follows. The registers for PARAMETER 1 are configured by the user to cause MUX 1 to select the Ethernet port number by specifying the attribute ID to be value 1 in register 602A. Note that there is no offset for PARAMETER 1 and for this reason MUX 1 sets the size to be 4 bits in its output to compressor 221. The user has also configured the registers for PARAMETER 2 to cause MUX 2 to select the VLAN tag, by specifying the attribute ID to be value 3. Once again, there is no offset for PARAMETER 2 and for this reason MUX 2 sets the size to be 16 bits in its output to compressor 221 (which is the size of the VLAN tag). The user has further configured the registers for PARAMETER 3 to cause MUX 3 to select the Ether Type, by specifying the attribute ID to be value 2. Once again, there is no offset for PARAMETER 3 and for this reason MUX 3 sets the size to be 16 bits in its output to compressor 221 (which is the size of the Ether Type). Note that all of the configuration described in this paragraph has been done by the user by simply identifying the relative locations of the attributes in attribute register file 213 (e.g. the values 1, 3 and 2 were identified respectively for PARAMETERs 1, 2 and 3), without any reference whatsoever to any physical locations of the corresponding values in a frame. Therefore, the user specifies the key without regard to the encapsulation of each frame.

The registers for PARAMETER 4 are symbolically configured by the user to cause MUX 4 to select a byte in the L2 payload, by specifying the attribute ID to be value 5. Note that here the user must specify an offset of the desired byte, relative to the beginning of the L2 payload for PARAMETER 4 which has been specified to be of value 9. Hence, during frame processing, MUX 4 selects a single byte located at offset 9 from the beginning of the L2 payload and also MUX 4 sets the size to be 8 bits in its output to compressor 221. As seen from FIGS. 1A-1G, the beginning of the L2 payload (which begins after the L2 header) changes depending on the encapsulation. For example, L2 payload begins at octet 14 in FIG. 1A, at octet 17 in FIG. 1B, at octet 22 in FIG. 1C, at octet 18 in FIG. 1D, at octet 22 in FIG. 1E, at octet 26 in FIG. 1F and octet 30 in FIG. 1G. Regardless of what the encapsulation of a given frame is, MUX 4 automatically selects the byte at offset 9 from the L2 payload.

Similarly, the user has symbolically configured the registers for PARAMETERs 5 and 6 to cause the respective MUXes 5 and 6 to select the respective bytes in the IP payload, by specifying the attribute ID to be value 4. The only difference in the user's configuration of PARAMETERs 5 and 6 is the relative location of the byte to be returned, which is 2 and 3. Note that in making the configurations described in this paragraph (and in the previous paragraph), the user made no reference whatsoever to any physical locations in a frame (and did so without any concern about the type of encapsulation). Instead, in these examples, the user merely specified locations of the bytes to be retrieved relative to beginning of the L2 payload or relative to the beginning of the IP payload which could be different in each frame, depending on its encapsulation.

As shown in FIG. 6, the values generated by MUXes 1-6 are used by compressor 221 with their relative sizes, to strip off the padding bits and concatenate the remainder to form key 409 (which in this example happens to be 60 bits long). Key 409 is then used with memory 230 to identify instructions to be executed by processor 240. In this exemplary embodiment, memory 230 includes a ternary CAM 610 that is configured by the user via GUI 401 to include a number of entries, each entry consisting of a search value and a mask, including the following entry (wherein each character in the following hexadecimal representation is for a nibble, i.e. 4 bits):

|  | column 1 | column 2 | column 3 | column 4 | column 5 |
|---|---|---|---|---|---|
| value | 0x2 | 0x0080 | 0x0800 | 0x06 | 0x0050 |
| mask | 0xF | 0x0FFF | 0xFFFF | 0xFF | 0xFFFF |

In the above entry in the ternary CAM 610, the user must specify values in the same order and size as the order and size of the values configured in the corresponding parameters register file 402, in order for frames containing the matching values to be identified. In the example illustrated above, the user is specifying that the matching frame must have arrived on port 2 (as per column 1 in above table) of integrated circuit 200, because the most significant nibble in the key was used by the user (when configuring the registers for PARAMETER 1) to represent the Ethernet port number (which is 4 bits long in this example).

In a similar manner, the user is specifying that the matching frame must have a VLAN ID of 0x0080 (as per column 2 in above table). Note that in some embodiments, the VLAN ID occupies only the least significant 12 bits of the VLAN tag (which is 16 bits long). As the user doesn't care about the upper nibble of the VLAN tag, hence the mask value is set to "0FFF" in the second row of column 2 in the above table (with the "0" specifying don't care and the "F" specifying a match). Therefore, only frames with VLAN ID of 128 will match the above-described TCAM entry. Also, as per column 3 in the above table, the user is specifying that the matching frame must have an Ether type (which is 16 bits long) of 0X0800 which means that the matching frame contains an IPv4 packet (in most embodiments).

In the above illustrative TCAM entry, the user has specified (by the value 0x06 in column 4) that the just-described frames containing IP v4 packets must have the 8-bit value 0x06 at byte offset 9 from the beginning of the L2 payload. This value 0x06 indicates the presence of a packet in the TCP format of the Internet Protocol (IP). Finally, the user has specified by requiring two bytes (total of 16 bits) at the respective IP payload offsets 2 and 3 to have the value 0x0050 (which translates to value 80 in decimal), so that the matching frame contains an embedded TCP/IP packet addressed to the destination port 80, commonly used for the HTTP protocol.

In the embodiment illustrated in FIG. 6, a result of the search is provided by TCAM 610 as an index into a static random access memory (SRAM) 620 that contains a set of instructions to be executed by processor 240. Note that the user loads any desired instructions into SRAM 620 via the GUI 401, in the normal manner. In some embodiments, the SRAM 620 merely provides a jump instruction for processor 240 to load a set of instructions in RAM 630 that serves as the "main memory" for processor 240. The instructions to be executed by processor 240 from RAM 630 may be any instructions of the type well known in the art and commonly used for packet processing. Furthermore, in some embodiments, a register 409 that holds the key generated by compressor 221 is used directly as an index into RAM 630 instead of being used in TCAM 610.

In some embodiments, TCAM 610 may be designed to have one or more additional fields in each entry, such as a database identifier 611 (shown dashed in FIG. 6 and not shown in the above table). Such a database identifier may be used with or without the Ethernet port number, to enable a user to uniquely specify a search pattern for a given architecture of integrated circuit 200 (e.g. depending on the total number of ports). In several embodiments, a database identifier is provided when a search operation is identified, along with the type of database (e.g. CAM or RAM), and the register file to be used (from among a number of register files) for generation of a key.

Moreover, in some embodiments, a single register file 402 which holds the user-specified parameters for preparation of the key may be addressable by processor 240 with instructions prepared by the user to load new values into register file 402, resulting in preparation of an additional key for a given frame. The additional key which is again held in register 409 (thereby overwriting the initially generated key for this frame), is used in the above described manner, to once again find a set of instructions to be executed by processor 240 (either from the SRAM 620 or from the RAM 630 depending on the embodiment).

Figure 7:
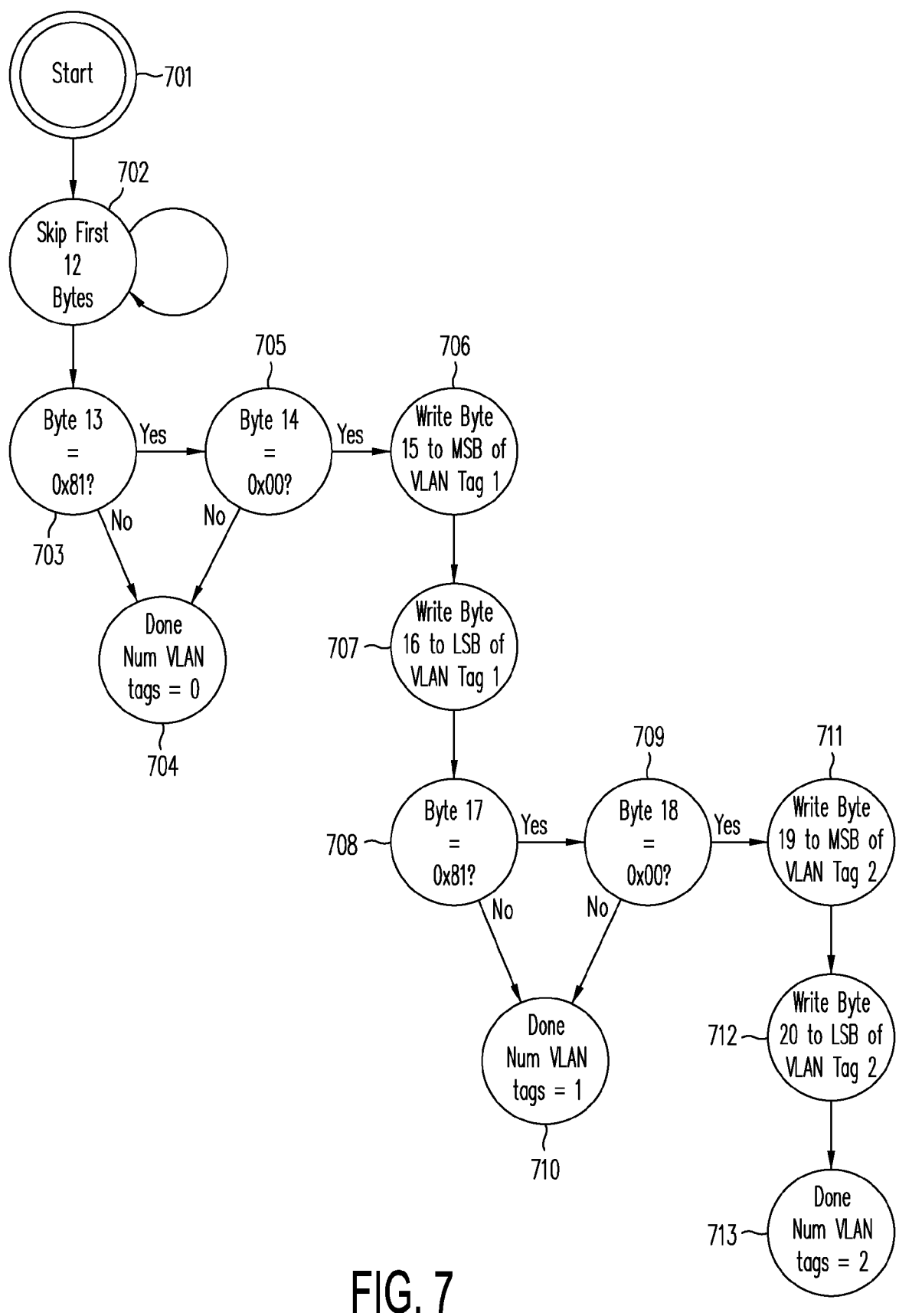
FIG. 7 illustrates a state machine that is used for an encapsulation decoder as per some embodiments of the invention.

In some embodiments, decoder 211 (FIG. 3) is implemented in combinational logic after the entire header of an incoming frame has been accumulated, although other embodiments use sequential logic, such as a state machine, to implement decoder 211 as illustrated in FIG. 7. Specifically, the state machine of FIG. 7 starts in state 701 and goes to state 702 to skip the first 12 octets (labeled octets 0-11 in FIG. 1A) of an incoming frame. Next, in state 703, the thirteenth byte (labeled byte 12) is examined for being equal to value 0x81. In this manner, the state machine parses the incoming data of a frame, on a byte-by-byte basis as shown in FIG. 7. Each state transition represents a new byte being examined by the state machine. This state machine is easily implemented in hardware using common sequential logic design methods.

Note that this state machine (shown in FIG. 7) is limited to decoding the number of VLAN tags, the value of the first VLAN tag, and the value of the next (nested) VLAN tag. Also note that the Packet_Type field (either MPLS or IP) is not decoded by this state machine (shown in FIG. 7) as it is not needed for this case. Instead, an independent state machine that operates in parallel decodes this field, and other fields like it. Also, in this embodiment, the VLAN tag values are cleared at the beginning and therefore need not be explicitly cleared when it is determined they are invalid.

Note that the state machine illustrated in FIG. 7 is merely an example to show how the VLAN tags are decoded instead of using combinational logic. Hence, although a staged architecture is illustrated and described in reference to FIG. 5, as will be apparent to the skilled artisan, such hardware may be implemented by use of one or more state machines of the type illustrated in FIG. 7.

Figure 8:
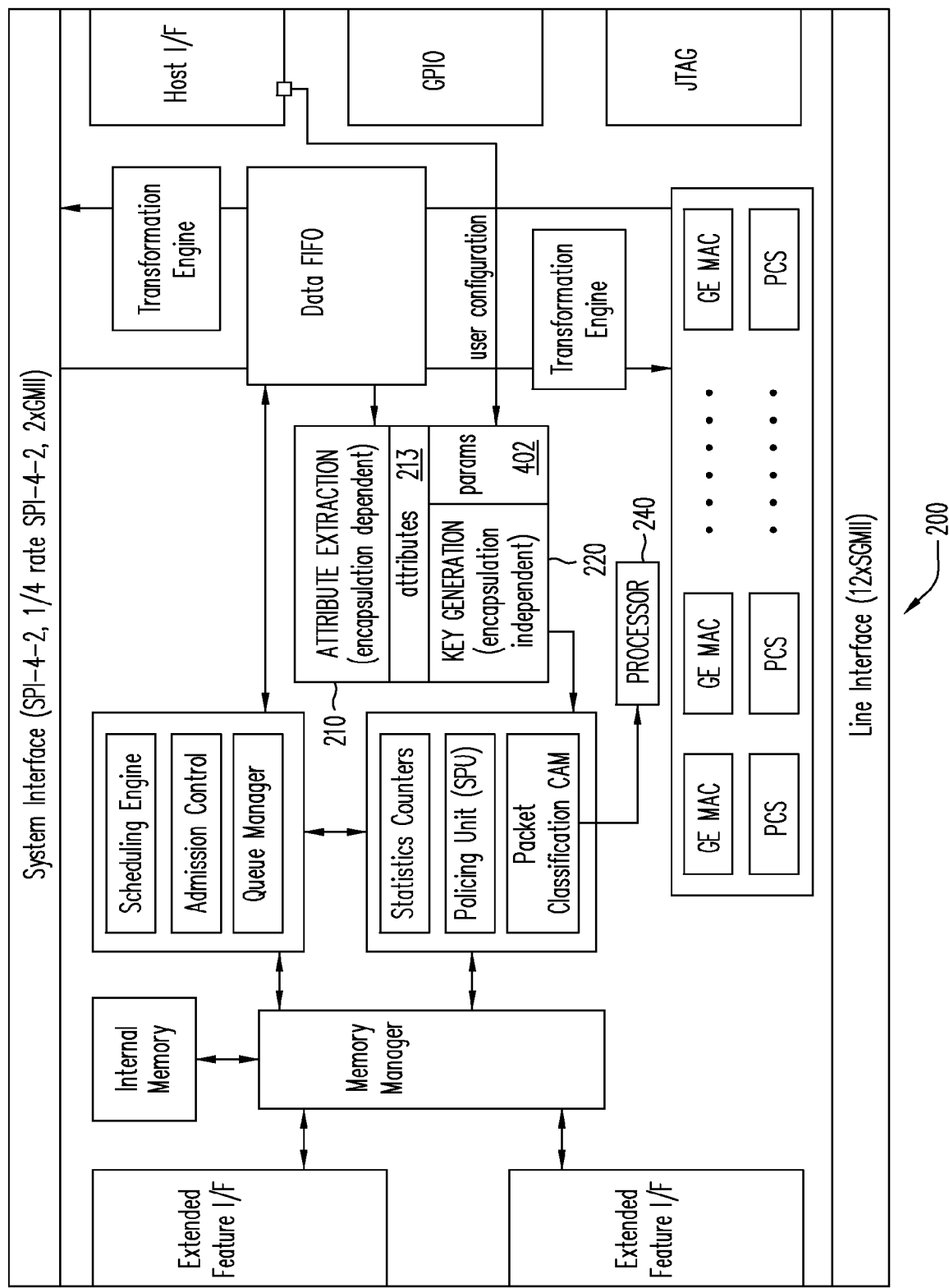
FIG. 8 illustrates an integrated circuit that uses the circuitry of FIG. 2 with other hardware blocks such as a Policing Unit (SPU), statistics counters, packet classification CAM, queue manager, admission control logic, scheduling engine, transformation engine, memory manager and data first-in-first-out (FIFO) memory, to process packets in some embodiments of the invention.

Moreover, the above-described combination of attribute extraction hardware 210, attributes register file 213, key generation hardware 220, parameters register file 402, and processor 240 (together referred to below as a configurable search engine) may be used as illustrated in FIG. 8 with a number of other blocks that are commonly used in an integrated circuit for performing packet processing, in the normal manner. For example, the frame that is received on a port (such as a Gigabit Ethernet port formed by a GE MAC block and a physical connection sublayer shown at the bottom of FIG. 8) is held in a data First-In-First-Out memory that supplies the frame's data to block 210 in the configurable search engine. Also, a key generated by block 220 in the configurable search engine is used with a packet classification CAM to identify a set of instructions (also called "profile") to be used in any one or more of processor 240, policing unit, statistics counters, admission control block, queue manager, scheduling engine and transformation engine.

Several of the just-mentioned blocks are described in a generic manner in Attachment B and in a more detailed manner in Attachment C, for an illustrative embodiment of the invention. Each of Attachments B and C located below just before the claims is an integral portion of this patent application and is incorporated by reference herein in its entirety. Moreover, a detailed description of how to parse a received frame to retrieve its attributes is provided in the C language in a file named "parser.txt" in APPENDIX A attached hereto in electronic form. As noted above, "parser.txt" is incorporated by reference herein in its entirety.

The description herein is presented to enable one to make and use the invention, and is provided in the context of particular applications and their requirements. It is not intended to be exhaustive or to limit the invention to the forms disclosed. Various modifications to the disclosed embodiments will be readily apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. Accordingly, many modifications and variations will be apparent to the skilled artisan in view of the disclosure.

For example, although a packet processor of some embodiments is described as being built to use a content addressable memory or alternatively as a random access memory, other architectures may be used for efficient storage of such information. For this reason, many embodiments of the packet processor support both kinds of memories RAM and CAM.

Numerous such modifications and adaptations of the embodiments and variants described herein are encompassed by the appended claims.

Attachment B

Network processors of the prior art often face competition from fixed-function ASICs for packet processing applications. A strong advantage provided by network processors is the flexibility afforded by programmability. This flexibility minimizes the cost of correcting errors and lengthens the hardware life cycle by enabling adaptation to evolving requirements via software-based enhancements. Conversely, network processors typically do not achieve the price/performance ratio of fixed-function ASICs. Additionally, there is a perception that network processors can be difficult to program. Thus, the flexibility afforded by network processors comes at a cost.

A user-configurable packet processor in some embodiments of the invention uses a hybrid approach that can be viewed as a new class of packet processors, which provide the following advantages:

1) maintain a significant percentage of the flexibility afforded by network processors,
2) achieve a price/performance point that is much closer to that of fixed-function ASICs, and
3) provide the flexibility in a simpler manner.

Hence the user-configurable packet processor of many embodiments is not programmed with a procedural language to classify incoming frames; instead, the search operation of the packet processor is controlled by the user symbolically identifying a set of attributes of a frame, and corresponding values that a matching frame is to have. The user configures this information into the packet processor in the form of parameters which provide flexibility, but do so at a higher level of abstraction that is simpler to use by a user. While the user-specified parameters do provide significant flexibility, they are constrained to a pre-defined set of network-specific operations that are implemented in hardware, which enables better price/performance.

Note that an example instantiation includes:
a set of 12 Gigabit Ethernet (GE) line interfaces,
a system interface (with options for full-rate SPI-4.2, ¼ rate SPI-4.2, or 2 GEs),
two Extended Feature Interfaces (EFIs) that support off-chip expansion of memory/lookup resources,
a configurable search engine, and
a set of hardware co-processors that include:
    a Packet Classification Content Addressable Memory (CAM),
    a Policing Unit (SPU) that implements rate-limiting algorithms,
    Statistics Counters,
    a Queue Manager,
    an Admission Control block,
    a Scheduling Engine, and
    a Transformation Engine.

For illustration purposes, consider the following packet processing flow:

1) a packet is received on a GE line interface,
2) an initial search operation is selected based on the packet format and configuration information,
3) the search key is formed by extracting the required information,
4) the key is used to perform a search operation,
5) the result of the search operation indicates a set of actions to be performed, which may invoke hardware co-processors; additionally, one of the possible actions can select a set of parameters to be used for a subsequent hierarchical search operation, which implies repeating steps 3-5,
6) after all search operations have completed, a queue is selected for the packet,
7) admission control is performed to determine if the packet is admitted to the queue,
8) subsequently, the scheduling engine selects the packet for transmission,
9) the Transformation Engine then executes a set of commands that result in the packet being transmitted on a system interface, while possibly also transforming the packet contents.

A configurable search engine of the type described above is a core element of several embodiments. Most of the other blocks are derivatives of technology that is currently used in AMCC network processor products. The Configurable search engine not only contains new technology, but also integrates existing blocks in a new manner that enables the above-described advantages to be realized.

In many embodiments, the functions implemented by the configurable search engine include:
parsing of received packets and selection of initial search operation,
extraction of information required to form search key,
initiation of search operation,
interpretation of search results, and
management of action execution.

To further clarify operation of several embodiments, separate subsections are devoted to each of the following topics:
packet attributes,
configuration of search parameters,
selection of initial search operation,
extraction of search key,
search operations,
search results,
action execution,
queue selection,
admission control,
scheduling, and
packet transformation.

As noted elsewhere herein, a set of attributes is associated with each received packet. Each packet attribute has a value that is initialized by hardware. Some attribute values may also be explicitly set by actions specified in search results. Attribute values provide information that may be used during subsequent processing steps, such as queue selection, admission control, and packet transformation. In some cases, attribute values control subsequent processing steps, while, in other cases, attribute values are used as data. The following table contains an example set of packet attributes.

Example Set of Packet Attributes

| Attribute | Value |
| --- | --- |
| Port Number | Identifies interface that packet was received on. |
| Encapsulation Type | Identifies packet encapsulation type. Examples for Ethernet frames include Ethernet v2, IEEE 802.3 SNAP, or IEEE 802.3 non-SNAP. |
| VLAN Tag Count | Number of VLAN Tags associated with packet. |
| VLAN Tag | VLAN Tag associated with packet. |
| VLAN STP State | Spanning Tree Protocol state. |
| DSCP/EXP | Differentiated Services CodePoint for IP packet, or value of EXPerimental bits for MPLS packet. |
| Color | Green, Yellow, or Red. |
| Transformation Profile ID | Identifies a particular profile that contains a set of commands to be executed by the Transformation Engine. |
| User Data | Defined by user, set by search result actions. |

The configurable search engine provides a flexible mechanism for the user to configure a set of search operations. The following table contains an example set of parameters that might be used to configure a search operation.

Example Set of Search Operation Parameters

| Parameter | Description |
| --- | --- |
| Database Type | Specifies type of database to be searched. For example, whether the database is implemented in a CAM or in RAM, and whether the database is implemented with internal or external memory resources. |
| Database ID | Identifies a particular database to be searched. |
| Count of Key Definition Parameters | Number of key definition parameters in following list. |
| List of Key Definition Parameters | List of parameters that specify the key to be used for the search operation. |

Based on the above table, a search operation is configured by the user specifying the database to be searched and the key format to be used for the search. The key format to be used is configured by specifying a list of key definition parameters. The following table contains an example set of key definition parameters.

Example Set of Key Definition Parameters

| Parameter | Description |
| --- | --- |
| Port Number | Identifies interface that packet was received on. |
| Encapsulation Type | Identifies packet encapsulation type. Examples for Ethernet frames include Ethernet v2, IEEE 802.3 SNAP, or IEEE 802.3 non-SNAP. |
| EtherType or DSAP/SSAP | This parameter is specific to Ethernet frames. It contains the EtherType value from the packet header when the encapsulation type is Ethernet v2 or IEEE 802.3 SNAP; otherwise, it contains the {DSAP, SSAP} values from the packet header when the encapsulation type is IEEE 802.3 non-SNAP. |
| VLAN Tag Count | Number of VLAN Tags associated with packet. |
| VLAN Tag | VLAN Tag associated with packet. |
| Nested VLAN Tag | Second VLAN Tag associated with packet (only applicable when multiple VLAN Tags are associated with packet). |
| VLAN STP State | Spanning Tree Protocol state. |
| Packet Offset | Field at configured offset from start of packet. |
| L2 Payload Offset | Field at configured offset from start of layer-2 payload. |
| IP Payload Offset | Field at configured offset from start of IP payload. |
| User Data Attribute Offset | Field at configured offset within User Data Attribute associated with packet. |

The key definition parameters shown in the above table provide value in a number of ways. First, the parameters enable keys to be defined using higher levels of abstraction. To illustrate this point, consider the EtherType value, which identifies the layer-3 protocol. The exact location of the EtherType field in the packet header varies depending upon the encapsulation type and the number of VLAN tags that are present. However, use of EtherType key definition parameter enables the user to specify that the EtherType value be included in the search key, without having to worry about where the EtherType value actually resides in the packet header. This abstraction is not only a considerable simplification, but also saves significant lookup resources that would otherwise be required to decode the various packet header combinations. The same value proposition arguments can be made for the other key definition parameters that represent packet-header abstractions.

To further clarify the preceding point, consider that the layer-3 protocol type could be determined with a Ternary CAM (TCAM) database using only the Packet Offset key definition parameter, which enables keys to be formed with fields that are at specific offsets from the start of the packet. However, the determination would require multiple TCAM entries, and when combined with other, similar search criteria, the multiplicative effect can create an explosion of TCAM size requirements.

As we have seen, the key definition examples include a set of more generic offset-based parameters. In addition to the previously discussed Packet Offset parameter, the set includes L2 Payload Offset, IP Payload Offset, and User Data Attribute Offset parameters. The L2 Payload Offset and IP Payload Offset options are higher-level abstractions of the Packet Offset parameter. The value of the abstractions is based on the fact that the layer-2 and IP payloads are not always located at fixed locations within the packet. For a TCP/IP packet, the L2 Payload Offset parameter simplifies access to fields in the IP header, while the IP Payload Offset parameter simplifies access to fields in the TCP header.

The User Data Attribute Offset parameter enables fields from the User Data Attribute associated with the packet to be included in search keys. Since values can be assigned to User Data Attribute fields as the result of search operations, the User Data Attribute Offset parameter enables the results of a previous search operation to provide input to a subsequent hierarchical search.

A particular instantiation of a configurable search engine may support definition of many search operations (e.g., 64 or more). Therefore, a question arises as to which definition should be used for the initial search operation performed on a received packet. One solution, would be to identify the definition to be used for the initial search operation via configuration by the user. However, the desired search key can vary based on the protocol type, for example. Therefore, a better solution, in terms of flexibility and efficiency, is to enable configuration of multiple definitions, where each definition is associated with, for example, a different protocol type. As an example, consider a solution that supports configuration of 4 different initial search operations, with one configuration for each of the following protocols:

IPv4,
IPv6,
MPLS, or
non-IP/MPLS protocols.

To implement this approach, the configurable search engine contains hardware capable of performing the packet header parsing necessary to identify the protocol type.

Hardware packet parsing capabilities of the Configurable search engine are also utilized to form the search key based on the key definition parameters. In the running example we have been using, the hardware capabilities include parsing of:

Ethernet v2, IEEE 802.3 SNAP, or IEEE 802.3 non-SNAP MAC header formats,
VLAN Tag and Nested VLAN Tag header formats, and
IPv4, IPv6, and MPLS protocol headers.

After forming the key, the Configurable search engine hardware initiates the search operation on the appropriate database. As mentioned earlier, the database may be implemented in a TCAM or in RAM, and the database implementation may be internal or external to the packet processor. A RAM-based search operation might be as simple as using the key as an index into a table.

The basic result of a search operation is a database entry that is associated with the search key. The database entry can specify a set of actions that are to be performed as a result of matching the search operation request. The following table contains an example set of search result actions.

Example Set of Search Result Actions

| Action | Description |
| --- | --- |
| Set Counter | Update counter (e.g., add 1 or length of packet in octets). |
| Discard Packet | Discard this packet. |
| Set VLAN Tag Attribute | Set value of VLAN Tag Attribute associated with packet. |
| Set DSCP Attribute | Set value of DSCP Attribute associated with packet. |
| Set User Data Attribute | Set value of User Data Attribute associated with packet. |
| Police | Subject packet to rate-limiting algorithm. |

-continued

| Action | Description |
|---|---|
| Set Queue | Select queue that packet is to be buffered in. |
| Set Interface | Select interface that packet is to be transmitted on. |
| Set Transformation Profile ID Attribute | Select profile that is to be executed for packet by Transformation Engine. |
| Set Search Operation | Select next search operation to be performed, or indicate that this was the final search to be performed for packet. |

An integrated circuit containing the configurable search engine may also contain hardware that interprets and executes the actions specified by the search result database entry. In some cases, execution of an action may be implemented by invoking a hardware co-processor. For example, the policing unit is invoked as part of implementing a Police Action in the above table. The specific manner in which the Police Action is implemented provides another example of value via flexibility.

The policing unit of some embodiments supports multiple rate-limiting algorithms, including the Single Rate Three Color Marker (srTCM), defined in RFC 2697, and the Two Rate Three Color Marker (trTCM), defined in RFC2698. Both the srTCM and the trTCM provide a color-aware mode of operation, where the color of the packet is an input to the algorithm.

The configurable search engine supports color-aware operation in a simple, but flexible manner based on Pre-Color Mapping Tables. An IP Pre-Color Mapping Table is used for IP packets and a MPLS Pre-Color Mapping Table is used for MPLS packets. The DSCP Attribute of an IP packet is used as an index into the IP Pre-Color Mapping Table. Similarly, the EXP Attribute of a MPLS packet is used as an index into the MPLS Pre-Color Mapping Table. Each Pre-Color Mapping Table Entry indicates whether the color input to the rate-limiting algorithm should be GREEN, YELLOW, RED, or the value of the Color Attribute associated with the packet. In this manner, the user is able to control the inputs to the rate-limiting algorithm.

The result of the rate-limiting algorithm is also a color. Rather than impose fixed semantics on the color, the Configurable search engine uses a set of Policing Result Mapping Tables to determine the action that is to be taken. Nine Policing Result Mapping Tables are used, where a set of 3 tables are used for IP packets, a set of 3 tables are used for MPLS packets, and a set of 3 tables are used for non-IP/MPLS packets. In each set of 3 tables, one table is used when the rate-limiting result is GREEN, a second table is used when the result is YELLOW, and a third table is used when the result is RED. Similar to the Pre-Color Mapping Tables, the DSCP Attribute is used as an index into the IP Policing Result Mapping Tables, and the EXP Attribute is used as an index into the MPLS Policing Result Mapping Tables. Each Policing Result Mapping Table Entry may indicate a set of actions to be performed, such as discard the packet, initiate flow control, set the DSCP/EXP Attribute, and/or set the Color Attribute.

After all search operations have completed, a queue is selected for each received packet. As discussed previously, the queue can be explicitly selected by a search result action. However, if the queue is not explicitly specified, a flexible mechanism, based on the following tables, is employed for queue selection:

DSCP=>Queue Mapping Table,
EXP=>Queue Mapping Table, and
VLAN Priority=>Queue Mapping Table.

Naturally, the DSCP=>Queue Mapping can be used for IP packets, and is indexed using the DSCP Attribute. Analogously, the EXP=>Queue Mapping Table can be used for MPLS packets, and is indexed using the EXP Attribute. The VLAN Priority=>Queue Mapping Table can be used for any packet, and is indexed used the VLAN Priority component of the VLAN Tag Attribute. Each Queue Mapping Table Entry identifies a specific queue.

Once the queue is selected, admission control is performed to determine if the packet will be admitted or discarded. Admission control is used to manage the available buffer memory in times of congestion due to oversubscription. The basic idea is to allocate the memory in accordance with the Quality of Service (QoS) policies in effect. The exact form of the admission control algorithm is not fundamental to this invention. A set of admission control algorithm options could be provided, such as WRED, or the Dynamic Threshold Group Algorithm that is used in multiple AMCC network processor/traffic management products. The Color Attribute of the packet is used as an input to some admission control algorithms, including WRED and Dynamic Threshold Groups.

Subsequent to being admitted to a queue, packets are scheduled for transmission. The scheduling can be performed with conventional algorithms, such as Strict Priority and Weighted Round Robin, and may include features such as Max Rate Capping. As was the case with admission control, the exact form of the scheduling algorithm is not fundamental to this invention.

After a packet is selected by the scheduling algorithm, the Transformation Engine executes a set of commands that can result in the packet being transmitted on an interface. The commands may also transform the packet contents prior to transmission. For example, the following types of transformations could be performed:

addition of new data to the packet (e.g., a new header/trailer),
    deletion of a portion of the packet data, and/or
    modification of the value of a particular field in the packet (such as the DSCP field of an IP packet header).

The group of commands that is executed by the Transformation Engine is referred to as a profile, and a particular instantiation of the invention may support definition of many profiles that perform different packet transformations. The particular profile that is executed for a given packet is determined by the value of the Transformation Profile ID Attribute. The values of other Packet Attributes are available as parameters to the commands executed by the Transformation Engine. For example, the values of the Packet Attributes can be included in the packet data. Additionally, the values of the User Data Attribute can be used as pointers to constant data stored in memory local to the Transformation Engine.

Note that the packet transformation operations could be performed earlier in the packet processing flow, such as prior to the queuing step, without any fundamental impact to the operation of a configurable search engine of some embodiments.

Attachment C

An integrated circuit called "nPC2315" in the form of an Ethernet MAC controller is described herein as an illustrative embodiment of the invention that provides high levels of functionality at disruptive cost points by integration of key system features. More specifically, the nPC2315 is targeted at Gigabit Ethernet (GE) applications in both LAN and WAN, with support for both flexible media-speed operation and intelligent oversubscription. The nPC2315 devices used in Enterprise boxes-aggregation layer, distribution layer—as well as Enterprise appliances such as VPN gateways, Content switches, Load balancers, and so on. The nPC2315 devices are also used in WAN Access, Edge and Core Routers, and Switches as the high-functionality Ethernet aggregation front-end into these boxes.

The nPC2315 is a 12-port Intelligent Oversubscribed MAC with one SPI-4.2 uplink (wire rate and oversubscribed modes) or 2xGMII uplinks with embedded memory and flexible options for external memory (both payload and context) and coprocessor interfaces (TCAM or external coprocessing logic). Intelligent oversubscription in a MAC device enables a cost effective migration to 10/100/1000 ports without needing to upgrade existing chassis in the field. Not all L2/L3 functions are required to enable intelligent oversubscription and offer Class of Service (CoS). Therefore, there is an opportunity for an intelligent MAC device that is optimized to perform these functions and complement existing silicon implementations. The nPC2315 employs the AMCC industry-leading traffic management technology to manage oversubscription and provide Quality of Service (QoS) across the ports. The nPC2315 also performs advanced packet classification, policing, statistics collection, and packet marking functions. The nPC2315 is defined as an evolutionary solution and is designed to be complementary to the existing L2/L3 forwarding subsystems, allowing end customers to upgrade to higher density linecards, conserve precious processing resources in the system, and not cause any forklift upgrade to existing systems. Other intelligent MAC devices in the nPC2300 family are a highly-integrated 24-port derivative of the nPC2315, a 12-port derivative with integrated PHYs, and an oversubscribed Nx10GE intelligent MAC.

Key features of nPC2315 are as follows. Ethernet Line Interfaces: 12 Ethernet ports, 10/100/1000 Mbps tri-speed support, Serial Gigabit Media Independent Interface (SG-MII) to PHYs.

System Interfaces System Packet Level Interface Phase 4 Level 2 (SPI-4.2), Supports up to 12 Gbps data rate (for media-speed operation), Also supports quarter-rate operation at 3 Gbps (for oversubscription), Packet and interleaved modes in both ingress and egress directions OR Two GMII Ethernet interfaces (for up to 12:1 oversubscription) with load balancing support between the two interfaces.

CPU Interfaces: 16-bit, 100-MHz Host CPU interface. Up to 200 Mbps of packet throughput.

Integrated Memory Total of 12 Mbits of internal memory, Up to 8 Mbits of internal payload memory, Supports configurable partitions for use as payload buffer memory, multi-field classification result blocks, user-defined counters, and/or policing contexts.

Integrated Packet Classification Engine (PC-CAM): High-density Ternary Content Addressable Memory (TCAM), a CAM array with a 4-bit database ID and a 7-bit weight field per 64-bit entry for efficient table management, 256 Kbits in density, Support for 32-, 64-, 128-, and 192-bit keys, Support for 16 databases via a 4-bit tag associated with each 64-bit entry, Key size configurable on a per-database basis Extended Feature Interfaces (EFIs)
    Two external memory interfaces that can each be configured as either a 16-bit QDR SRAM interface or a 32-bit RLDRAM interface:
    QDR SRAM interface can be used as:
    NPF LA-1 compliant interface to external TCAMs
    External interface to QDR SRAM for user-defined counters and/or policing contexts
    Interface to user-designed coprocessing logic for features differentiation
    RLDRAM interface can be used as:
    External Payload Memory Interfaces
    With both external memory interfaces configured as external payload at 330 MHz, the sustained throughput achieved is 10 Gbps, full duplex, for all packet sizes Statistics
    RMON Ethernet Statistics (defined in RFC 1757)
    Support for 32- and 64-bit user-defined counters
    Counters may be maintained in internal memory
    Counters may be stored in external SRAM Multi-Field Classification (MFC)
    Multiple MFCs per ingress frame
    Support for multiple MFC databases
    An MFC database may reside in an internal TCAM or external TCAM
    Key sizes defined on a per-database basis, with support for 32-, 64-, 128-, and 192-bit keys
    Flexible, user-defined configuration of the fields that comprise each key
    Symbolic definition of selected fields, which may not always be at a fixed offset within the frame (for example, VLAN IDs)
    Byte-granular fields at configured offset relative to start of MAC header, start of Layer-2 payload, start of IPv4 payload, and/or start of IPv6 payload
    Nested MFC key defined by preceding MFC result
    Per-port configuration of multiple key selection for the initial MFC that is performed on a frame, where:
    First key is used for IPv4 frames
    Second key is used for IPv6 frames
    Third key is used for MPLS frames
    Fourth key is used for all other frame types
    Powerful set of actions that can be specified as a result of an MFC match:
    Increment the counter by 1
    Increment the counter by the length of the frame in octets
    Discard the frame
    Assign a VLAN priority to the frame
    Assign a VLAN ID to the frame
    Assign a Differentiated Services Code Point (DSCP) value to the frame
    Police the frame
    Explicitly select a queue for the frame
    Select a modification profile to be performed on the frame, for example:
    Add VLAN Tags
    Remove VLAN Tags
    Set user data to be associated with the frame in the header that may be optionally prepended before forwarding
    Indicate whether a subsequent MFC is to be performed, and specify the key to be used for the MFC Port Security
    Per-port configuration mode, where an ingress frame is accepted only if its source MAC address matches one of a configured set of source MAC addresses
    Special case for Multi-field Classification (MFC)
    Configured set of source MAC addresses may be stored in an integrated CAM, or in an external TCAM
    Key for source MAC address lookup in the port-security database includes a 4-bit GE port number, along with the 48-bit MAC address Policing
  Multiple policing operations per ingress frame
  Byte-level granularity
  Standard-based Token Bucket algorithms
  Support for Single-Rate Three-Color Marker (defined in RFC 2697)
  Support for Two-Rate Three-Color Marker (defined in RFC 2698)
  Support for color-blind and color-aware modes
  Table-driven mechanism to determine the pre-color for color-aware mode; indexed by the MFC result
  Table-driven mechanism to determine the action for non-conforming frames, where actions include:
  Discard the frame
  Mark the frame
  Initiate flow control
  Support for incrementing a counter when a frame is discarded due to non-conformance, where the counter to increment is specified as part of the MFC result block that initiated the policing operation
Queuing
  96 queues for ingress transmission onto the system (uplink) interface
  Four queues for the CPU Host interface (two for ingress, two for egress)
  24 queues for egress transmission onto the Ethernet line interface
  Ingress queue selected by a table-driven mechanism that can be overridden by the MFC result
  Three ingress queue-selection tables for each Ethernet line interface port, where:
  First table is for IP frames and is indexed by the DSCP value
  Second table is for MPLS frames and is indexed by the EXP value
  Third table is for all other frame types and is indexed by the VLAN priority value
  Load-balancing across multiple Ethernet system interfaces using one of the following algorithms configurable on a line-interface basis:
  Assignment of line interface to a particular system interface
  Hashing based on {source IP address, destination IP address, IP protocol, source port number, destination port number} 5-tuple
  Hashing based {destination MAC address, source MAC address} tuple
Admission Control
  Dynamic Threshold Admission Control or Weighted Random Early Detection (WRED) Admission Control, selectable on a per-queue basis
  Dynamic Thresholding
  102 Dynamic Threshold Groups (96 ingress, two egress, and four CPU)
  Six Dynamic Threshold profiles (four ingress, one egress, and one CPU)
  Eight regions per group
  Two threshold values per region: discard and queue limit
  WRED Thresholding
  96 WRED Groups (ingress queues)
  Four WRED profiles
  Eight regions per profile
  Three threshold values per region: green, yellow, and red
  Region is determined based on the threshold group buffer occupancy and/or overall payload memory buffer occupancy
Scheduling
  Sophisticated hierarchical scheduling: Output Queue level and Port level
  Schedulers at each level can be configured for Strict Priority (SP) or Weighted Round Robin (WRR) scheduling
  A Maximum Shaper can be configured for each scheduler to impose an upper-bound on the rate at which traffic is scheduled
  Shaped Egress traffic characteristics are maintained (optional-available only if no multicast is activated)
Packet Modification
  128 ingress frame modification profiles for adding/removing/modifying frame content
  16 egress frame modification profiles for adding/removing/modifying frame content
  Each modification profile supports 16 packet modification commands (actions)
  Ingress profile selectable by the Multi-Field Classification (MFC) or Extended Feature Interface (EFI) result
  Egress profile selectable by the egress classification header generated by an upstream device or forwarding subsystem somewhere else in the system
Flow Control
  IEEE 802.3x flow control
  Can be initiated as a result of policing non-conformance
  Can be initiated as a result of admission control
  SPI-4.2 flow control
  Can be initiated as a result of admission control
IP Header Checksum
  Supports IP Header Checksum recalculation and rewrite
VLAN Support
  VLAN state awareness
  4K VLAN ID classifications per port
  Nested VLAN support
Egress Multicast
  One multicast queue per port, up to one copy per port
  Up to 1 K multicast packets per port
  The nPC2315 supports Multi-Field Classification (MFC) of ingress frames received from Ethernet line interfaces. Zero, one, or multiple MFCs may be performed for each received frame. The number of MFCs that can be performed per frame without impacting forwarding performance is dependent upon the key sizes used and the particular databases that are being accessed (for example, whether the databases are internal or external) as discussed below. The basic flow is straightforward: Per-port configuration parameters control whether an initial MFC is performed, and if so, what key and database should be used. An MFC result block is associated with each MFC database entry. The result block specifies actions that are to be performed when a lookup matches the entry. One of the supported actions indicates that a subsequent MFC is to be performed. The Set MFC Action specifies the key and database that are to be used for the subsequent MFC.

The nPC2315 supports definition of multiple different key formats. Keys are defined in a flexible manner using the parameters shown in FIG. 9, as described below.

Domain Number
  A 4-bit domain number may be configured for each Ethernet line interface. The domain number can be used to conserve MFC database space by enabling a single policy entry to be applied to a group of ports that are assigned to the same domain.

EtherType or DSAP/SSAP
  The Ethernet v2 and IEEE 802.3 SNAP encapsulation formats contain an EtherType field that is used to identify the type of Layer-3 protocol data unit that is contained in the frame's information field. The non-SNAP IEEE 802.3 LLC encapsulation does not contain an EtherType field, but does contain DSAP and SSAP fields that can be used to identify the type of protocol data unit that is contained in the frame's information field. The key field associated with the EtherType or DSAP/SSAP parameter contains either an EtherType value or {DSAP, SSAP} values from the frame based on the encapsulation type (where the 8-bit DSAP value is taken from byte-offset 14 in the frame and the 8-bit SSAP value is taken from byte-offset 15 in the frame).

The IEEE 802.1Q standard defines an EtherType value of x8100 to indicate the presence of a VLAN Tag. The initial EtherType is followed by a 16-bit VLAN Tag, which is followed by a second EtherType value that is used to identify the type of Layer-3 protocol data unit carried in the frame. Network equipment vendors have expanded the VLAN Tag concept to support multiple nested VLAN Tags. In doing so, some vendors have used non-standard EtherType values (for example, x9100 or x88A8). Consequently, the nPC2315 provides special support to flexibly identify the presence of VLAN Tags. A frame is considered tagged if its EtherType matches either of two port-based configurable values: taggedVlanEtherType_1 or taggedVlanEtherType_2. Additionally, a tagged frame is deemed to contain multiple VLAN Tags if the 16-bit EtherType value immediately following the outermost VLAN Tag matches either taggedVlanEtherType_1 or taggedVlanEtherType_2. For frames containing a single VLAN Tag, the EtherType key field contains the 16-bit value immediately following the VLAN Tag in the frame. For frames containing multiple VLAN Tags, the EtherType key field contains the 16-bit value immediately following the second VLAN Tag in the frame.

VLAN Tag

A VLAN Tag Attribute value is associated with each frame received by an Ethernet line interface. A defaultVlanTag configuration parameter is associated with each Ethernet line interface. For untagged frames, the VLAN Tag Attribute value associated with the frame is the contents of the defaultVlanTag parameter defined for the receiving port. For frames that contain a VLAN Tag, the VLAN Tag Attribute value associated with the frame is the contents of the outermost VLAN Tag in the frame. In either case, the VLAN Tag key field contains the VLAN Tag Attribute value associated with the frame.

Nested VLAN Tag

When a frame contains multiple VLAN Tags, the Nested VLAN Tag key field contains the second VLAN Tag in the frame. The Nested VLAN Tag key field is set to x0000 for frames that do not contain multiple VLAN Tags.

VLAN ID/Nested VLAN ID

The VLAN ID/Nested VLAN ID key field is a special case designed to enable efficient utilization of MFC database space (that is, where each database entry is 32 bits). The VLAN ID component of the key field contains the least-significant 12 bits of the VLAN Tag value associated with the frame. When a frame contains multiple VLAN Tags, the Nested VLAN ID component of the key field contains the least-significant 12 bits of the second VLAN Tag in the frame. The Nested VLAN ID component of the key field is set to x000 for frames that do not contain multiple VLAN Tags.

VLAN STP State

The VLAN STP State field may be used to include the current Spanning Tree Protocol (STP) state in the MFC key. The nPC2315 maintains a 4K×2-bit array for each Ethernet line interface that can be programmed to indicate the STP state on a per-VLAN basis. When a frame is received by an Ethernet line interface, the VLAN ID component of the VLAN Tag Attribute is used as an index into the VLAN STP State Array. The contents of the selected array entry are stored in the VLAN STP State Attribute associated with the frame. The VLAN STP State key field contains the VLAN STP State Attribute value associated with the frame.

MAC Offset

The MAC Offset parameter is used to specify a key field that contains an 8-bit value taken from the frame contents at a configured byte-offset relative to the beginning of the MAC header (that is, the first byte of the Destination MAC Address is at offset 0). Multiple MAC Offset parameters may be used in a single key definition. For example, the Source MAC Address could be included in the key using six MAC Offset parameters, with offsets 6-11. The maximum byte-offset that can be configured for the MAC offset parameter is 127.

L2 Payload Offset

The L2 Payload Offset parameter is used to specify a key field that contains an 8-bit value taken from the frame contents at a configured byte-offset relative to the beginning of the Layer-2 Payload. As an example, consider that for an IP frame, the first byte of the IP header is at offset 0. Multiple L2 Payload Offset parameters may be used in a single key definition. As another example, consider that for a MPLS frame, the outermost label-stack entry could be included in the key using four L2 Payload Offset parameters, with offsets 0-3. To enable the L2 Payload Offset parameter functionality, the nPC2315 includes logic to identify the beginning of the Layer-2 payload. This logic operates as follows:

a) Ethernet v2 encapsulation with no VLAN Tags, Layer-2 payload begins at byte-offset 14 in the frame.
b) Ethernet v2 encapsulation with one VLAN Tag, Layer-2 payload begins at byte-offset 18 in the frame.
c) Ethernet v2 encapsulation with multiple VLAN Tags, Layer-2 payload begins at byte-offset 22 in the frame.
d) IEEE 802.3 SNAP encapsulation with no VLAN Tags, Layer-2 payload begins at byte-offset 22 in the frame.
e) IEEE 802.3 SNAP encapsulation with one VLAN Tag, Layer-2 payload begins at byte-offset 26 in the frame.
f) IEEE 802.3 SNAP encapsulation with multiple VLAN Tags, Layer-2 payload begins at byte-offset 30 in the frame.
g) IEEE 802.3 non-SNAP encapsulation, Layer-2 payload begins at byte-offset 14 in the frame.

The maximum byte-offset that can be configured for the L2 Payload Offset parameter is 63.

IP Payload Offset

The IP Payload Offset parameter is used to specify a key field that contains an 8-bit value taken from the frame contents at a configured byte-offset relative to the beginning of the IP Payload. As an example, consider that for an IPv4 frame carrying TCP, the first byte of the TCP header is at offset 0.

Multiple IP Payload Offset parameters may be used in a single key definition. As a second example, consider that for an IPv4 TCP frame, the Destination Port could be included in the key using 2 IP Payload Offset parameters, with offsets 2 and 3.

For IPv4, the nPC2315 calculates the start of the IP Payload field based on the value of Header Length in the IP header.

For IPv6, the IP Payload field starts 40 bytes from the beginning of the IPv6 header. The maximum byte-offset that can be configured for the IP Payload Offset parameter is 31. The IP Payload Offset parameter is supported for Ethernet v2 and 802.3 SNAP encapsulations. The IP Payload Offset parameter is not supported for 802.3 non-SNAP encapsulations.

User Data Attribute Offset

The User Data Attribute Offset parameter is used to specify a key field that contains an 8-bit value taken from the User Data Attribute associated with the frame. The value is taken from a location at a configured byte-offset relative to the beginning of the User Data Attribute. For example, the first byte of the User Data Attribute is at offset 0, the second byte is at offset 1, and so on. The contents of the User Data Attribute associated with a frame may be set by specifying a Set User Data Action in an MFC result block as described below. One possible use of the User Data Attribute Offset parameter is to utilize results from a previous MFC operation as a component of the key for subsequent MFC operations.

The MFC key format consists of eight fixed-function header bits followed by user-defined fields, as shown in FIG. 10. Note: Four different key sizes are supported: 32, 64, 128, or 192 bits. The user-defined fields of an MFC key are configured by specifying a sequence of the key definition parameters shown in FIG. 9. An MFC lookup operation is configured by specifying the parameters shown in FIG. 11.

The nPC2315 supports definition of 64 different sets of MFC Lookup Parameters. A particular set of MFC Lookup Parameters is identified using an MFC ID with values in the range [0 . . . 63]. The Key Definition Parameter List merits additional explanation. The list is composed of a sequential array containing 26 entries. The list is variable-sized, ranging from 0 to 26 entries, with the Key Definition Parameter Count indicating the number of valid entries. All of the valid entries must appear sequentially, beginning with the first array entry. Each entry in the list is composed of a 4-bit Parameter ID field and a 7-bit Parameter Argument field, as shown in FIG. 12.

The Parameter ID field identifies one of the key definition parameters defined in FIG. 9.

The Parameter Argument field is used to specify the byte-offset associated the MAC Offset, L2 Offset, IP Payload Offset, and User Data Attribute Offset parameters.

Note that the total size of the key fields produced by the Key Definition Parameter List is limited by the size of the key defined for the database that the lookup accesses; more specifically, the total size of the key fields produced by the Key Definition Parameter List is limited by the size of the User-Defined component of the key as defined in FIG. 10. FIG. 12 shows Format of Key Definition Parameter List Entry. The initial MFC lookup is controlled by the parameters shown in FIG. 13. Note: There are separate sets of parameters for controlling the initial MFC lookup at each Ethernet line interface. Also note that the following throughout this specification:

IPv4 frames are identified by an Ethernet v2 or IEEE 802.3 SNAP encapsulation with an EtherType value of x0800.

IPv6 frames are identified by an Ethernet v2 or IEEE 802.3 SNAP encapsulation with an EtherType value of x86DD.

MPLS frames are identified by an Ethernet v2 or IEEE 802.3 SNAP encapsulation with an EtherType value of x8847.

MFC Actions

An MFC result block is associated with each MFC database entry. The result block specifies actions that are to be performed when a lookup matches the entry. If there is no match on an MFC lookup, then the forwarding procedure continues to the queue selection phase. Similarly, if a frame is not discarded as the result of an MFC action, then the forwarding procedure continues to the queue selection phase upon completion of the last MFC for the frame. An MFC result block always includes a 32-bit action specification header, and may include an optional set of extension fields.

The format of the header is shown in FIG. 14. The format of an MFC result block is illustrated in FIGS. 15A and 15B. Multiple actions can result from an MFC lookup. Actions are performed in the order in which they are listed in FIG. 14. If the Discard Frame Action is specified, no subsequent actions are applicable. All of the fields in the MFC result block, except for the header, are optional. If an optional field is present, it must appear in the order listed in FIGS. 15A and 15B. The following are additional descriptions of MFC result block fields:

Result Block Size

The size of the MFC result block, including the header, is specified in the Result Block Size field within the header. The result block size must be a multiple of 64 bits, and four different sizes are supported (that is, 64, 128, 192, and 256 bits). The value specified in the Result Block Size field controls the number of memory reads performed by the nPC2315 to fetch the result block. There is no requirement that the specified block size be completely utilized for MFC fields (that is, a trailing portion of the block can be unused). However, there is a requirement that all of the fields associated with the specified actions must fit within the specified block size. It is an error to specify a combination of actions for which the associated fields do not fit in the specified block size.

Set Counter 1 Action, Set Counter 2 Action (Counter Pointer)

Zero, one, or two counter operations may be specified in an MFC result block. If the Set Counter 1 Action is specified in the header, then the Counter 1 Size field is present in the body of the result block. Similarly, if the Set Counter 2 Action is specified in the header, then the Counter 2 Size field is present in the body of the result block. If either the Set Counter 1 Action or the Set Counter 2 Action is specified in the header, then the Counter Pointer field is present in the body of the result block. If both the Set Counter 1 Action and the Set Counter 2 Action are specified, then the counters must be stored in contiguous memory locations (with Counter 1 first, followed by Counter 2).

Set Discard Counter Action (Number of Discard Counters, Discard Counter Size, Discard Counter Pointer) The Set Discard Counter Action may be used to maintain statistics regarding frames that are discarded as a result of the Discard Frame Action, the Police Action, or admission control features. If the Set Discard Counter Action is specified in the header, then the Number of Discard Counters, Discard Counter Size, and Discard Counter Pointer fields are present in the body of the result block. The Number of Discard Counters field specifies the number of discard counters contained in the memory block pointed to by the Discard Counter Pointer field. The following formats are supported:

A format with a single discard counter.

A format with three discard counters, where the first counter in the memory block is for green-colored frames, the second counter in the memory block is for yellow-colored frames, and the third counter in the memory block is for red-colored frames. The specified Discard Counter Size applies to all the counters in the memory block. Note: The Color Attribute of a frame received by an Ethernet line interface is initialized to green upon reception, and may be subsequently altered as the result of a policing operation.

Set Interface Action (Interface Number)

If the Set Interface Action is specified in the result block header, then the Interface Number field is present in the body of the result block. The Interface Number field in the result block explicitly identifies an interface that the frame is to be forwarded out. Valid interfaces include the following:
- System interface #1
- System interface #2
- CPU interface Set User Data Action (User Data Byte 0-6 Mode, User Data Byte 0-6 Source) If the Set User Data Action is specified in the result block header, then the User Data Byte 0-6 Mode and the User Data Byte 0-6 Source fields are present in the body of the result block. The Set User Data Action sets the value of the User Data Attribute associated with the frame. The value of the User Data Attribute is initialized to 0 when a frame is received from an Ethernet line interface. A subset of the attributes associated with a frame, including the User Data Attribute, are accessible as parameters to the frame modification profile. The modification profile may interpret the User Data Attribute directly as user data or as an address of a memory block containing user data. The User Data Attribute size is seven bytes, where Byte 0 contains the least-significant eight bits (that is, bits 0-7), and Byte 6 contains the most-significant eight bits (that is, bits 48-55). The body of the MFC result block contains a User Data Byte Mode field for each byte of the User Data Attribute (that is, the User Data Byte 0 Mode field controls the operation performed on Byte 0 of the User Data Attribute). The following types of operations may be specified by a User Data Byte Mode field:

- No operation (that is, do not modify the associated byte of the User Data Attribute).
- Write Immediate User Data to the associated byte field within the User Data Attribute.
- Write a byte of the current MFC key to the associated field within the User Data Attribute.

The body of the MFC result block also contains a User Data Byte Source field that is associated with each User Data Byte Mode field. The contents of a User Data Byte Source field may be used as follows:

- If the operation to be performed utilizes immediate data, then the User Data Byte Source field contains the immediate data that is written to the associated byte field within the User Data Attribute.
- When the operation to be performed utilizes data extracted from the current MFC key, the User Data Byte Source field contains a byte-offset relative to the beginning of the current MFC key. The byte-offset identifies the location within the current MFC key at which user data is to be extracted. The user data extracted from the MFC is then written to the associated byte field of the User Data Attribute. As a final comment on this topic, note that the contents of the User Data Attribute can be used as a component of MFC keys. Thus, the Set User Data Actions also provide a mechanism for conveying results from one MFC into a subsequent MFC operation.

Set VLAN Priority Action, Set VLAN ID Action (VLAN Priority, VLAD ID)

As discussed previously, a VLAN Tag Attribute is associated with each frame received by an Ethernet line interface. The VLAN Tag Attribute contains two sub-attributes, the VLAN Priority Attribute and the VLAN ID Attribute, which can be independently modified by MFC actions.

- If the Set VLAN Priority Action is specified in the result block header, then the VLAN Priority field is present in the body of the result block. The content of the VLAN Priority field in the result block is used as the value of the VLAN Priority Attribute associated with the frame.
- If the Set VLAN ID Action is specified in the result block header, then the VLAN ID field is present in the body of the result block. The content of the VLAN ID field in the result block is used as the value of the VLAN ID Attribute associated with the frame.

Set DSCP Action (DSCP)

A DSCP Attribute is also associated with IP frames. The DSCP Attribute is initialized to the value of the DSCP field in the frame's IP header (that is, the most-significant six bits of the TOS field in the IP header). The DSCP Attribute can be subsequently modified as the result of MFC actions. If the Set DSCP Action is specified in the result block header, then the DSCP field is present in the body of the result block. The content of the DSCP field in the result block is used as the value of the DSCP Attribute associated with the frame.

Police Action (Policing Algorithm, Policing Mapping Tables Selection Mode, Pre-Color Mapping Mode, Policing Result Mapping Mode, and Policing Context Pointer)

If the Police Action is specified in the result block header, then the Policing Algorithm, Policing Mapping Tables Selection Mode, Pre-Color Mapping Mode, Policing Result Mapping Mode, and Policing Context Pointer fields are present in the body of the result block.

- The Policing Algorithm field specifies the policing algorithm that is to be used.
- The Policing Mapping Tables Selection Mode is used to select the set of mapping tables to be used for the policing operation.
- The Pre-Color Mapping Mode field is used when determining the color of frame prior to executing a color-aware policing algorithm.
- The Policing Result Mapping Mode field is used when determining the actions to be performed as a result of the policing operation.
- The Policing Context Pointer field in the result block contains the address of a data structure representing the context for the policing operation that is to be performed.

Set Queue Action (Queue Number)

If the Set Queue Action is specified in the result block header, then the Queue Number field is present in the body of the result block. The Queue Number field in the result block explicitly identifies a queue to which the frame is to be assigned.

Set Modification Profile Action (Profile Selection Algorithm, Modification Profile ID)

If the Set Modification Profile Action is specified in the result block header, then the Profile Selection Algorithm field and the Modification Profile ID field are present in the body of the result block.

- The Set Modification Profile Action sets the value of the Modification Profile ID Attribute associated with the frame.
- The Modification Profile ID Attribute selects a particular set of user-defined commands that are to be executed before the frame is forwarded.
- The Modification Profile ID is set to a default value of 0 when a frame is initially received from an Ethernet line interface. The Modification Profile ID field in the result block is used as a parameter to the Profile Selection Algorithm.
- The following profile selection algorithms are supported:
- Modification Profile ID Attribute=Modification Profile ID Field
- Modification Profile ID Attribute=Modification Profile ID Attribute+Modification Profile ID Field This algorithm enables a subsequent MFC to modify the profile selection made by a previous MFC. For example, one MFC could select a block of profiles, and a subsequent MFC could then use this algorithm to select a particular profile from the previously selected block.

Modification Profile ID Attribute=Modification Profile ID Field+Encapsulation Attribute This algorithm enables conservation of MFC entries, since one MFC can be used for multiple encapsulation types, and this algorithm can then be used to select the proper modification profile for the given frame encapsulation type. More specifically, the algorithm supports selection of different modification profiles for the Ethernet v2, 802.3 SNAP, and 802.3 non-SNAP frame encapsulations.

Modification Profile ID Attribute=Modification Profile ID Field+((VLAN Tag Count Attribute <<2)+Encapsulation Attribute))

This algorithm enables conservation of MFC entries, since one MFC can be used for multiple frame formats, and this algorithm can then be used to select the proper modification profile for the given frame format. More specifically, the algorithm supports selection of different modification profiles for the following frame formats:

Ethernet v2 encapsulation with no VLAN Tags
Ethernet v2 encapsulation with one VLAN Tag
Ethernet v2 encapsulation with two VLAN Tags
802.3 SNAP encapsulation with no VLAN Tags
802.3 SNAP encapsulation with one VLAN Tag
802.3 SNAP encapsulation with two VLAN Tags
802.3 non-SNAP encapsulations)

The values of the Encapsulation Attribute and the VLAN Tag Count Attribute are shown in FIG. 16.

Note: The Modification Profile Attribute is not applicable for frames that are forwarded via the Host CPU interface (since the packet transformation feature is not available for frames forwarded via the Host CPU interface).

Set MFC Action (MFC ID)

If the Set MFC Action is specified in the result block header, then the MFC ID field is present in the body of the result block. The MFC ID field in the result block identifies a set of lookup parameters for the next MFC that is to be performed on the frame.

If the Set MFC Action is not specified in the result block header, then the current MFC is the final MFC performed on the frame.

If multiple MFCs are performed for a frame, and a given action is specified multiple times, then the most recently specified action takes precedence. More specifically, this precedence rule applies to the following actions:

Set Discard Counter Action
Set VLAN Priority Action
Set VLAN ID Action
Set DSCP Action
Set Queue Action
Set Interface Action
Set User Data Action
Set Modification Profile Action Note: A caveat to the above precedence rule exists for the Set User Data Action and the Set Modification Profile Action, since algorithms are defined for these actions that enable the most recent action to either completely override or incrementally modify previous actions.

Frame Attributes

The discussion of the MFC Actions above has identified some attribute values that may be associated with a frame. Attribute values are used at various stages of processing within the nPC2315. For example:

The Color Attribute and DSCP Attribute may be used during policing operations.

The VLAN Priority Attribute and DSCP Attribute may be used as the basis for queue selection.

The Color Attribute may be used during admission control.

Additionally, a subset of the attributes values are made available as parameters to the frame modification profile. The frame modification profile may write attribute values to the associated fields within the frame, or include attribute values in a header that is optionally prepended to frames prior to transmission. FIG. 16 contains a list of the frame attribute values. A frame modification profile does not have access to all of the attribute values associated with a frame. A frame modification profile may access up to 80 bits of frame attribute values. The subset of frame attribute values that are accessible is configurable on a frame modification profile basis. The Frame Length Attribute and Modification Profile ID Attribute are always included in the subset of attribute values accessible by a frame modification profile, which leaves 56 bits of user-selectable frame attribute values. The user-selectable attribute values are configured via a Frame Attribute Selection Register. One Frame Attribute Selection Register is provided for each frame modification profile. The format of a Frame Attribute Selection Register is shown in FIG. 17.

The attributes accessible to a frame modification profile are stored in the order that they are listed in FIG. 16. Thus, the 80-bit attribute array always begins with the 16-bit Frame Length Attribute followed by the 8-bit Modification Profile ID Attribute. The attributes explicitly selected via the Frame Attribute Selection Register are stored after the Modification Profile ID Attribute. The User Data Attribute, starting with the most-significant bits, is then stored after all the explicitly selected attributes.

As an example, consider a frame modification profile for which the VLAN Tag Attribute, the VLAN STP State Attribute, and the DSCP/EXP Attribute are explicitly selected. In this case, the 80-bit accessible attribute array contains the following:

16-bit Frame Length Attribute
8-bit Modification Profile ID Attribute
16-bit VLAN Tag Attribute
2-bit VLAN STP State Attribute
6-bit DSCP/EXP Attribute
Most-significant 32 bits of the User Data Attribute

The invention claimed is:

1. A method of processing data from a network, the method comprising:

identifying, from a value at a fixed location in a frame, a type of encapsulation of data in the frame;

extracting, in hardware, a plurality of attributes of the frame from a corresponding plurality of locations in the frame based on the type of encapsulation;

wherein at least one attribute being extracted is at different locations in frames of different types of encapsulation;

generating a key, in hardware, by use of a group of attributes that are pre-selected by a user, from among the plurality of attributes;

wherein each attribute in the group is pre-selected by the user symbolically, without specifying a corresponding location in the frame for each type of encapsulation;

reading memory, using at least the key and a parameter, to identify a plurality of instructions, the parameter specifying a type of database to be searched by the key, among multiple types of databases, said parameter being specified by user configuration of a search operation to be performed with the key; and executing at least one instruction, identified by use of the key, to process the frame.

2. The method of claim 1 further comprising:
concatenating the key, with an identifier of a port on which the frame is received, to generate a modified key;
wherein the memory is looked-up using at least said modified key, to identify the plurality of instructions.

3. The method of claim 2 further comprising:
concatenating the modified key, with an identifier of a database associated with the port, to generate an extended key;
wherein the memory is looked-up using said extended key, to identify the plurality of instructions.

4. The method of claim 1 wherein:
the key is generated by concatenating at least the group of attributes.

5. The method of claim 1 wherein the different types of encapsulation comprise two or more of:
Ethernet v2 encapsulation with no VLAN tags;
Ethernet v2 encapsulation with one VLAN tag;
Ethernet v2 encapsulation with two VLAN tags;
802.3 encapsulation with no VLAN tags;
802.3 encapsulation with one VLAN tag; and
802.3 encapsulation with two VLAN tags.

6. The method of claim 1 wherein:
the key is used directly, without any logic processing, to perform memory look-up.

7. The method of claim 1 further comprising:
generating an additional key, in hardware, by use of an additional group of attributes; and
reading memory another time, using at least the additional key.

8. The method of claim 1 wherein:
the type indicates whether the database to be searched is implemented in a content addressable memory or in a random access memory.

9. The method of claim 1 wherein:
the type identifies whether the database to be searched is implemented with internal or external memory resources.

10. The method of claim 1 wherein:
the memory is read using a database identifier as an additional parameter, to identify the database to be searched from among the multiple databases.

11. An integrated circuit comprising:
an input port;
a decoder coupled to the input port to receive therefrom at least one value located at a predetermined location in a header, of a frame received at the input port;
a plurality of parsers, each parser being coupled to the decoder by an enable line, each parser being further coupled to the input port;
a first register, coupled to each parser in the plurality of parsers, the first register holding a plurality of attributes extracted from a corresponding plurality of locations in said header of the frame that differ depending on a type of encapsulation identified by the value at the predetermined location in the frame;
a second register that holds a plurality of identifiers of locations in the first register specified by a user; and
a key generation hardware coupled to the first register and to second register.

12. The integrated circuit of claim 11 further comprising:
a memory coupled to the key generation hardware to receive therefrom a key to be used in looking up the memory; and
a processor coupled to the memory to receive therefrom instructions to be executed by the processor.

13. The integrated circuit of claim 11 wherein:
the memory comprises a ternary content addressable memory (TCAM); and
at least the key is used to perform a parallel search in the TCAM.

14. The integrated circuit of claim 11 wherein:
the memory is a random access memory (RAM); and
at least the key is used as an index into the RAM.

15. A method of processing data from a network, the method comprising:
identifying, from a value at a fixed location in a frame, a type of encapsulation of data in the frame;
storing, in a register, a plurality of attributes of the frame extracted from a corresponding plurality of locations in a header of the frame based on the type of encapsulation;
wherein at least one attribute being extracted is at different locations in frames of different types of encapsulation;
generating an initial key, in hardware, by use of a group of attributes that are pre-selected by a user, from among the plurality of attributes stored in the register;
wherein each attribute in the group is pre-selected by the user symbolically, without specifying a corresponding location in the frame for each type of encapsulation;
reading memory, using at least the initial key, to identify a plurality of instructions;
generating an additional key, in hardware, by use of an additional group of attributes in said header that are specified in the plurality of instructions;
reading memory another time, using at least the additional key, to identify a plurality of additional instructions; and
executing at least one additional instruction, identified by use of the additional key.

16. The method of claim 15 further comprising:
concatenating the key, with an identifier of a port on which the frame is received, to generate a modified key;
wherein the memory is looked-up using at least said modified key, to identify the plurality of instructions.

17. The method of claim 16 further comprising:
concatenating the modified key, with an identifier of a database associated with the port, to generate an extended key;
wherein the memory is looked-up using said extended key, to identify the plurality of instructions.

18. The method of claim 15 wherein:
the key is generated by concatenating at least the group of attributes.

19. The method of claim 15 wherein the different types of encapsulation comprise two or more of:
Ethernet v2 encapsulation with no VLAN tags;
Ethernet v2 encapsulation with one VLAN tag;
Ethernet v2 encapsulation with two VLAN tags;
802.3 encapsulation with no VLAN tags;
802.3 encapsulation with one VLAN tag; and
802.3 encapsulation with two VLAN tags.

20. The method of claim 15 wherein:
the initial key is used directly, without any logic processing, to perform the reading memory to identify the plurality of instructions.

21. The method of claim 15 further comprising:
executing at least one instruction, identified by use of at least the initial key, to process the frame.

22. The method of claim 15 wherein:
the type indicates whether a database to be searched is implemented in a content addressable memory or in a random access memory.

23. The method of claim 15 wherein:
the type identifies whether a database to be searched is implemented with internal or external memory resources.

24. The method of claim 15 wherein:
in at least one of said readings, the memory is read using a database identifier as an additional parameter, to identify a database to be searched from among a plurality of databases.

25. An integrated circuit comprising:
means for identifying, from a value at a fixed location a frame, a type of encapsulation of data in the frame;
means for extracting a plurality of attributes of the frame from a corresponding plurality of locations in the frame based on the type of encapsulation;
wherein at least one attribute being extracted is at different locations in frames of different types of encapsulation; and
means for generating a key by use of a group of attributes that are pre-selected by a user, from among the plurality of attributes;
wherein each attribute in the group is pre-selected by the user symbolically, without specifying a corresponding location in the frame for each type of encapsulation;
means for reading memory, using at least the key and a parameter, to identify a plurality of instructions, the parameter specifying a type of database to be searched by the key, among multiple types of databases, said parameter being specified by user configuration of a search operation to be performed with the key; and
means, coupled to the means for reading memory, for executing at least one instruction, identified by use of the key, to process the frame.

26. The integrated circuit of claim 25 further comprising:
means for concatenating the key, with an identifier of a port on which the frame is received, to generate a modified key.

27. The integrated circuit of claim 26 further comprising:
means for concatenating the modified key, with an identifier of a database associated with the port, to generate an extended key.

28. The integrated circuit of claim 25 wherein the different types of encapsulation comprise two or more of:
Ethernet v2 encapsulation with no VLAN tags;
Ethernet v2 encapsulation with one VLAN tag;
Ethernet v2 encapsulation with two VLAN tags;
802.3 encapsulation with no VLAN tags;
802.3 encapsulation with one VLAN tag; and
802.3 encapsulation with two VLAN tags.

29. The integrated circuit of claim 25 wherein
the means for reading memory uses the key directly, without any logic processing, to perform memory look-up.

30. The integrated circuit of claim 25 further comprising:
means for generating an additional key by use of an additional group of attributes specified in the plurality of instructions; and
means for reading memory another time, using at least the additional key.

31. An integrated circuit comprising:
means for input;
means for decoding coupled to the means for input to receive therefrom at least one value located at a predetermined location in a header, of a frame received at the means for input;
multiple means for parsing, each means for parsing being coupled to the means for decoding by an enable line, each means for parsing being further coupled to the means for input;
first means for storing, coupled to each means for parsing in the plurality of means for parsing, wherein the first means holds a plurality of attributes extracted from a corresponding plurality of locations in said header of the frame that differ depending on a type of encapsulation identified by the value at the predetermined location in the frame;
second means for storing, wherein the second means holds a plurality of identifiers of locations in the first means for storing specified by a user; and
means for key generation coupled to the first means and to second means.

32. The integrated circuit of claim 31 further comprising:
a memory coupled to the means for key generation to receive therefrom a key to be used in looking up the memory; and
a processor coupled to the memory to receive therefrom instructions to be executed by the processor.

33. The integrated circuit of claim 31 wherein:
the memory comprises a ternary content addressable memory (TCAM); and
at least the key is used to perform a parallel search in the TCAM.

34. The integrated circuit of claim 31 wherein:
the memory is a random access memory (RAM); and
at least the key is used as an index into the RAM.

35. The integrated circuit of claim 31 wherein:
the means for key generation comprises means for concatenating.

36. An integrated circuit comprising:
means for identifying, from a value at a fixed location in a frame, a type of encapsulation of data in the frame;
means for storing, in a register, a plurality of attributes of the frame extracted from a corresponding plurality of locations in a header of the frame based on the type of encapsulation;
wherein at least one attribute being extracted is at different locations in frames of different types of encapsulation;
means for generating an initial key, in hardware, by use of a group of attributes that are pre-selected by a user, from among the plurality of attributes stored in the register;
wherein each attribute in the group is pre-selected by the user symbolically, without specifying a corresponding location in the frame for each type of encapsulation;
means for reading memory, using at least the initial key, to identify a plurality of instructions;
means for generating an additional key, in hardware, by use of an additional group of attributes in said header that are specified in the plurality of instructions;
means for reading memory another time, using at least the additional key, to identify a plurality of additional instructions; and
means for executing at least one additional instruction, identified by use of the additional key.

37. The integrated circuit of claim 36 further comprising:
means for concatenating the key, with an identifier of a port on which the frame is received, to generate a modified key.

38. The integrated circuit of claim 36 further comprising:
means for concatenating the modified key, with an identifier of a database associated with the port, to generate an extended key.

39. The integrated circuit of claim 36 wherein:
the means for generating the initial key comprises means for concatenating the group of attributes.

40. The integrated circuit of claim 36 wherein the different types of encapsulation comprise two or more of:
Ethernet v2 encapsulation with no VLAN tags;
Ethernet v2 encapsulation with one VLAN tag;
Ethernet v2 encapsulation with two VLAN tags;
802.3 encapsulation with no VLAN tags;
802.3 encapsulation with one VLAN tag; and
802.3 encapsulation with two VLAN tags.

41. The integrated circuit of claim 36 wherein:
the means for reading memory using the initial key performs memory look-up using the initial key directly without any logic processing.

42. The integrated circuit of claim 36 wherein:
the type indicates whether a database to be searched is implemented in a content addressable memory or in a random access memory.

43. The integrated circuit of claim 36 wherein:
the type identifies whether a database to be searched is implemented with internal or external memory resources.

44. The integrated circuit of claim 36 wherein:
the memory is read, by each of said means for reading memory, using an additional parameter.

* * * * *